(12) United States Patent
Baek et al.

(10) Patent No.: US 10,521,575 B2
(45) Date of Patent: Dec. 31, 2019

(54) AUTHENTICATION METHOD AND ELECTRONIC DEVICE USING THE SAME

(71) Applicant: Samsung Electronics Co., Ltd., Gyeonggi-do (KR)

(72) Inventors: Seunggeol Baek, Gyeonggi-do (KR); Ki Hong Min, Seoul (KR); Hee-Woong Yoon, Seoul (KR)

(73) Assignee: Samsung Electronics Co. Ltd (KR)

( * ) Notice: Subject to any disclaimer, the term of this patent is extended or adjusted under 35 U.S.C. 154(b) by 33 days.

(21) Appl. No.: 15/461,057

(22) Filed: Mar. 16, 2017

(65) Prior Publication Data

US 2017/0293749 A1 Oct. 12, 2017

(30) Foreign Application Priority Data

Apr. 12, 2016 (KR) .................. 10-2016-0044921

(51) Int. Cl.

| G06F 21/32 | (2013.01) |
|---|---|
| G06F 1/3234 | (2019.01) |
| G06F 1/3296 | (2019.01) |
| G06K 9/00 | (2006.01) |
| G06K 9/20 | (2006.01) |
| G06K 9/22 | (2006.01) |

(52) U.S. Cl.
CPC .............. *G06F 21/32* (2013.01); *G06F 1/325* (2013.01); *G06F 1/3262* (2013.01); *G06F 1/3265* (2013.01); *G06F 1/3296* (2013.01); *G06K 9/0002* (2013.01); *G06K 9/00006* (2013.01); *G06K 9/2009* (2013.01); *G06K 9/22* (2013.01)

(58) Field of Classification Search
CPC ........ G06F 1/325; G06F 1/326; G06F 1/3265; G06F 1/3296; G06F 21/32; G06K 9/2009; G06K 9/0002; G06K 9/22
USPC .......................................................... 726/19
See application file for complete search history.

(56) References Cited

U.S. PATENT DOCUMENTS

| 2011/0177847 A1 | 7/2011 | Huang |
| 2014/0198960 A1 | 7/2014 | Thompson et al. |
| 2015/0127965 A1 | 5/2015 | Hong et al. |

(Continued)

FOREIGN PATENT DOCUMENTS

| JP | 2008171238 | 7/2008 |
| JP | 2012-133506 | 7/2012 |

(Continued)

OTHER PUBLICATIONS

International Search Report dated Jun. 20, 2017 issued in counterpart application No. PCT/KR2017/002551, 8 pages.

(Continued)

*Primary Examiner* — Brandon S Hoffman
*Assistant Examiner* — Nega Woldemariam
(74) *Attorney, Agent, or Firm* — The Farrell Law Firm, P.C.

(57) ABSTRACT

An electronic device and an operating method thereof are provided. The electronic device includes a first processor, a second processor, a display, and a first sensor. The first processor receives an input through the first sensor while the display is in a deactivated state, and transmits the input to the second processor, when biometric data is detected in the input, and the second processor authenticates the biometric data included in the input, and activates the display if the authentication succeeds.

15 Claims, 24 Drawing Sheets

(56) References Cited

U.S. PATENT DOCUMENTS

2015/0199554 A1* 7/2015 Merrell .............. G06K 9/00033
382/124
2015/0362986 A1 12/2015 Lee et al.

FOREIGN PATENT DOCUMENTS

| JP | 2015-001800 | 1/2015 |
| KR | 1020150111043 | 10/2015 |
| KR | 1020150124873 | 11/2015 |

OTHER PUBLICATIONS

European Search Report dated Dec. 19, 2018 issued in counterpart application No. 17782576.7-1207, 7 pages.

* cited by examiner

AUTHENTICATION METHOD AND ELECTRONIC DEVICE USING THE SAME

PRIORITY

This application claims priority under 35 U.S.C. § 119(a) to Korean Patent Application Serial No. 10-2016-0044921, which was filed in the Korean Intellectual Property Office on Apr. 12, 2016, the entire content of which is incorporated herein by reference.

BACKGROUND

1. Field of the Disclosure

The present disclosure relates generally to an electronic device and a method of authentication.

2. Description of the Related Art

Electronic devices store a variety of personal information. The personal information has to be protected from the other people. A method of protecting the personal information is through user authentication. The user authentication can be carried out through biometric recognition of a user. The biometric recognition can include iris recognition, fingerprint recognition, facial recognition, line-of-palm recognition, venous network recognition, etc. The fingerprint recognition can secure high security at low cost. And, the fingerprint recognition is being widely used due to the merit that the miniaturization of a finger scan sensor is available.

To acquire fingerprint data for user authentication, a conventional electronic device continuously maintains an activation state of a finger scan sensor, even when the user does not conduct fingerprint recognition. This results in unnecessary power consumption occurring in the electronic device.

SUMMARY

The present disclosure has been made to address at least the above-mentioned problems and/or disadvantages and to provide at least the advantages described below.

Accordingly, an aspect of the present disclosure is to prevent the execution of an unnecessary authentication procedure and reduce power consumption according to fingerprint recognition, by selectively activating in an electronic device, a finger scan sensor and a processor for user authentication based on fingerprint recognition availability or non-availability (e.g., biometric data detection availability or non-availability) that is determined using at least a part of the finger scan sensor.

Accordingly, another aspect of the present disclosure is to reduce battery consumption resulting from the driving of a finger scan sensor in an electronic device.

In accordance with an aspect of the present disclosure, an electronic device is provided. The electronic device includes a first processor, a second processor, a display, and a first sensor. The first processor receives an input through the first sensor while the display is in a deactivated state, and transmits the input to the second processor, when biometric data is detected in the input, and the second processor authenticates the biometric data included in the input, and activates the display if the authentication succeed.

In accordance with another aspect of the present disclosure, a method is provided. The method includes while a display is in a deactivated state, processing, by a first processor, an input received through a first sensor, transmitting the input, by the first processor, to a second processor, when biometric data is detected in the input, authenticating, by the second processor, the biometric data included in the input; and activating, by the second processor, the display when the authentication succeeds.

In accordance with another aspect of the present disclosure, a computer-readable recording medium is provided. The computer-readable recording medium stores a program for executing the operations of while a display is in a deactivated state, processing, by a first processor, an input received through a first sensor, transmitting the input, by the first processor, to a second processor, when biometric data is detected in the input, authenticating, by the second processor, the biometric data included in the input, and activating, by the second processor, the display when the authentication succeeds.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT DISCLOSURE

Figure 1:
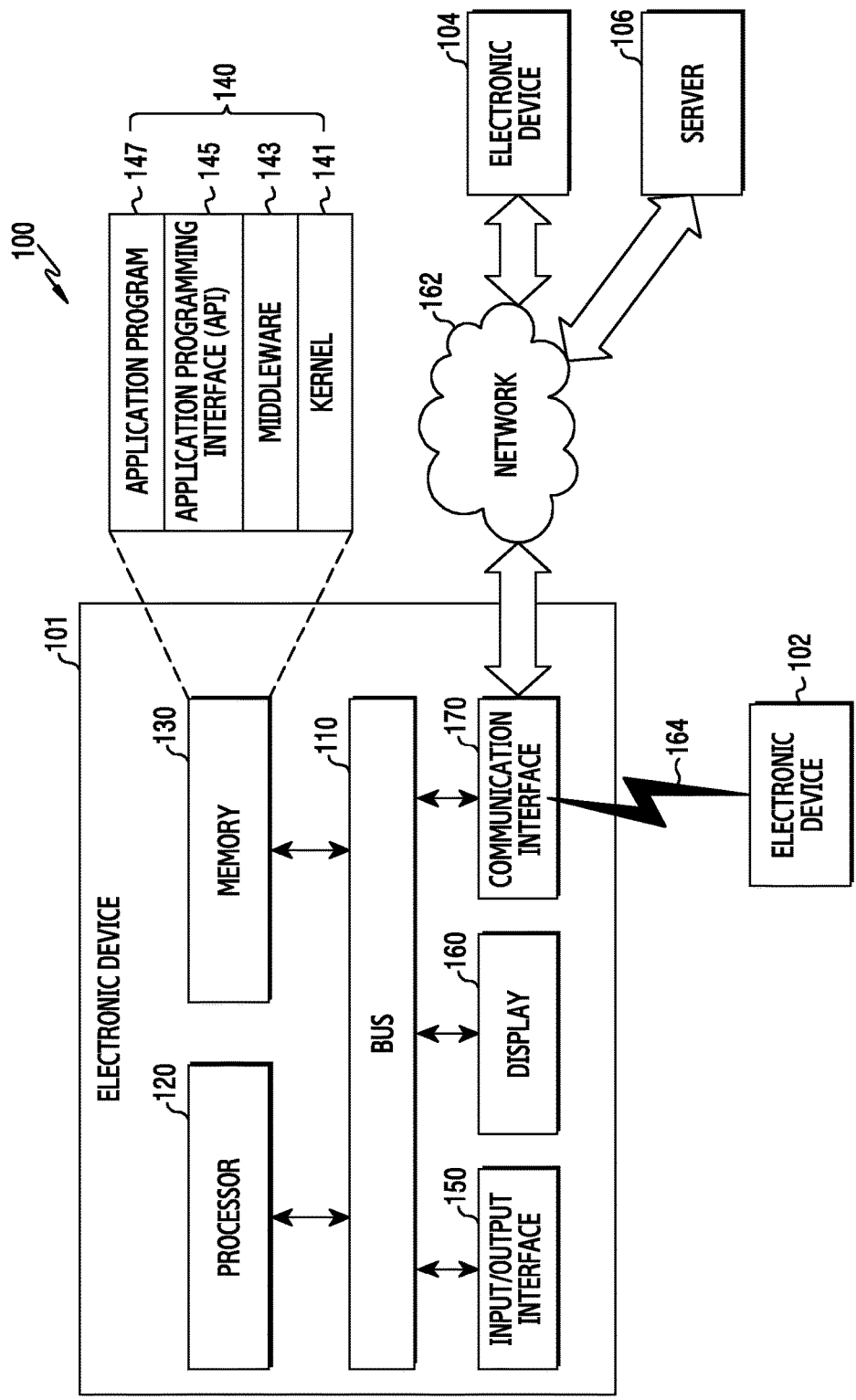
FIG. 1 is a block diagram of a configuration of an electronic device within a network environment, according to an embodiment of the present disclosure.

Hereinafter, various embodiments of the present disclosure will be described with reference to the accompanying drawings, in which similar reference numerals may be used to designate similar elements. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

The terms "have" and "include" used in the present disclosure indicate the presence of disclosed corresponding functions, operations, elements, features, steps, parts, or a combination thereof, and do not exclude one or more additional functions, operations, elements, features, steps, parts or a combination thereof. The terms "A or B", "at least one of A or/and B" or "one or more of A or/and B" used in the present disclosure include any and all combinations of words enumerated with it. For example, "A or B", "at least one of A and B" or "at least one of A or B" means (1) including A, (2) including B, or (3) including both A and B.

Although terms such as "first" and "second" used in the present disclosure may modify various elements, these terms do not limit the corresponding elements. For example, these terms do not limit an order and/or importance of the corresponding elements. These terms may be used for the purpose of distinguishing one element from another element. For example, a first user device and a second user device both indicate user devices and may indicate different user devices. For example, a first element may be referred to as a second element, and similarly, a second element may be referred to as a first element, without departing from the scope of the present disclosure.

When it is described that an element (e.g., first element) is "connected" or "coupled" to another element (e.g., second element), the element may be directly connected or coupled to the other element, or there may be an intervening element (e.g., third element) between the elements. To the contrary, when it is described that an element (e.g., first element) is "directly connected" or "directly coupled" to another element (e.g., second element), there is no intervening element (e.g., third element) between the elements.

The expression "configured to (or set to)" used in the present disclosure may be used interchangeably with the expressions "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a central processing unit (CPU) or an application processor (AP), capable of performing a corresponding operation by executing one or more software programs stored in a memory device.

The terms as used herein merely describe certain embodiments and are not intended to limit the present disclosure. As used herein, singular forms may include plural forms as well, unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly so defined in the present disclosure. Further, terms defined in the present disclosure should not be interpreted to exclude embodiments of the present disclosure.

The electronic device according to various embodiments of the present disclosure may include a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device (e.g., a head-mounted device (HMD), an electronic glasses, an electronic clothing, an electronic bracelet, an electronic necklace, an electronic appcessory, an electronic tattoo, a smart mirror, or a smart watch).

In other embodiments, an electronic device may be a smart home appliance. For example, an electronic device may include a television (TV), a digital versatile disk (DVD) player, an audio component, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™, PlayStation™), an electronic dictionary, an electronic key, a camcorder, or an electronic frame.

In other embodiments, an electronic device may include a medical device (e.g., a mobile medical device (e.g., a blood glucose monitoring device, a heart rate monitor, a blood pressure monitoring device, or a temperature meter), a magnetic resonance angiography (MRA) machine, a magnetic resonance imaging (MRI) machine, a computed tomography (CT) scanner, or an ultrasound machine), a navigation device, a global positioning system (GPS) receiver, an event data recorder (EDR), a flight data recorder (FDR), an in-vehicle infotainment device, an electronic equipment for a ship (e.g., ship navigation equipment and/or a gyrocompass), an avionics device, a security device, a head unit for vehicle, an industrial or home robot, an automatic teller machine (ATM), point of sale (POS) device, or an Internet of things (IoT) device (e.g., a lightbulb, a sensor, an electricity meter, a gas meter, a sprinkler, a fire alarm, a thermostat, a streetlamp, a toaster, a sporting equipment, a hot-water tank, a heater, a boiler, and the like).

In certain embodiments, an electronic device may include a piece of furniture or a building/structure, an electronic board, an electronic signature receiving device, a projector, and various measuring instruments (e.g., a water meter, an electricity meter, a gas meter, or a wave meter).

An electronic device may be a flexible device.

An electronic device according to various embodiments of the present disclosure may also include a combination of one or more of the above-mentioned devices. Further, it will be apparent to those skilled in the art that an electronic device according to various embodiments of the present disclosure is not limited to the above-mentioned devices.

FIG. 1 is a block diagram of a configuration of an electronic device within a network environment, according to an embodiment of the present disclosure.

Referring to FIG. 1, a network environment 100 including an electronic device 101 is provided. The electronic device 101 includes a bus 110, a processor 120, a memory 130, an input/output (I/O) interface 150, a display 160, and a communication interface 170.

The bus 110 may be a circuit for connecting the above-described elements (e.g., the processor 120, the memory 130, the I/O interface 150, the display 160 or the communication interface 170, etc.) with each other, and transferring communication (e.g., a control message) between the above-described elements.

The processor 120 can include one or more of a CPU, an AP, or a communication processor (CP). The processor 120 can execute operations or perform data processing for control and/or communication of at least one another element of the electronic device 101. The processor 120 can include a plurality of processors that are isolated operatively or physically. For one example, the processor 120 can include a first processor for determining if biometric data detection is available and a second processor for performing user authentication based on biometric recognition information. For instance, the first processor can consume a relatively lesser amount of electric power than the second processor.

The memory 130 may include any suitable type of volatile or non-volatile memory. The memory 130 may store an instruction or data received from the processor 120 or other elements (e.g., the I/O interface 150, the display 160, or the communication interface 170, etc.), or generated by the processor 120 or other elements. The memory 130 can store information required for authentication procedure execution. For instance, the information required for the authentication procedure execution can store a fingerprint image that is registered by a user.

The memory 130 includes programming modules 140 such as a kernel 141, a middleware 143, an application programming interface (API) 145, or an application program 147. Each of the programming modules may be configured using software, firmware, hardware, or a combination of these.

The kernel 141 may control or manage system resources (e.g., the bus 110, the processor 120, or the memory 130, etc.) used for executing an operation or a function implemented in the rest of the programming modules, for example, the middleware 143, the API 145, or the application program 147. Also, the kernel 141 may provide an interface for allowing the middleware 143, the API 145, or the application program 147 to access an individual element of the electronic device 101 and control or manage the same.

The middleware 143 may perform a mediation role so that the API 145 or the application program 147 may communicate with the kernel 141 to receive and transmit data. Also, in connection with task requests received from the application program 147, the middleware 143 may perform a control (e.g., scheduling or load balancing) for a task request using a method of assigning priority to at least one application program 147 for using a system resource (e.g., the bus 110, the processor 120, or the memory 130, etc.) of the electronic device 101.

The API 145 is an interface for allowing the application program 147 to control a function provided by the kernel 141 or the middleware 143, and may include at least one interface or function (e.g., an instruction) for file control, window control, image processing, character control, etc.

The I/O interface 150 may transfer an instruction or data input from a user via an I/O unit (e.g., a sensor, a keyboard, or a touchscreen) to the processor 120, the memory 130, or the communication interface 170 via the bus 110. For example, the I/O interface 150 may provide data regarding a user's touch input via the touchscreen to the processor 120. Also, the I/O interface 150 may output an instruction or data received via the bus 110 from the processor 120, the memory 130, or the communication interface 170 via the I/O unit (e.g., a speaker or a display). For example, the I/O interface 150 may output voice data processed by the processor 120 to a user via a speaker.

The display 160 may include a liquid crystal display (LCD), a light emitting diode (LED) display, an organic light emitting diode (OLED) display, a micro electro mechanical system (MEMS) display, or an electronic paper display. The display 160 may display various types of contents (for example, text, images, videos, icons, or symbols) for users. The display 160 may include a touch screen, and may receive a touch, gesture, proximity, or hovering input by using an electronic pen or a part of the user's body.

The communication interface 170 may connect communication between the electronic device 101 and an external device (e.g., a first external electronic device 102, a second external electronic device 104, or a server 106). For example, the communication interface 170 may be connected to the first external electronic device 102 via short-range communication 164 and may be connected to the second electronic device 104 and the server 106 through a network 162, through wireless communication or wired communication, and may communicate with an external device.

The wireless communication may use at least one of long term evolution (LTE), LTE-advance (LTE-A), code division multiple access (CDMA), wideband CDMA (WCDMA), universal mobile telecommunications system (UMTS), wireless broadband (WiBro), and global system for mobile (GSM) communications, as a cellular communication protocol. The wireless communication may include the short-range communication 164. The short-range communication 164 may include at least one of Wi-Fi, Bluetooth, Bluetooth low energy (BLE), Zigbee, near field communication (NFC), magnetic secure transmission (MST), or GNSS. The GNSS may include at least one of global positioning system (GPS), global navigation satellite system (GLONASS), Bei-Dou navigation satellite system (BeiDou), or Galileo, the European global satellite-based navigation system. Hereinafter, the term "GPS" and the term "GNSS" may be interchangeably used.

The wired communication may include at least one of universal serial bus (USB), high definition multimedia interface (HDMI), recommended standard 232 (RS-232), and plain old telephone service (POTS).

The network 162 may include at least one of communication networks, such as a computer network (for example, a local area network (LAN) or a wide area network (WAN)), the Internet, and a telephone network.

The external electronic devices 102 and 104 may be devices of the same type as the electronic device 101 or devices of different types from that of the electronic device 101. The server 106 may include a group of one or more servers. All or some of the operations executed in the electronic device 101 may be carried out in another electronic device or a plurality of electronic devices (for example, the external electronic device 102 or 104 or the server 106). When the electronic device 101 should perform some functions or services automatically or by a request, the electronic device 101 may make a request for performing at least some functions related to the functions or services to the external electronic device 102 or 104, or the server 106 instead of or in addition to performing the functions or services by itself. The external electronic device may carry out the functions requested by the electronic device 101 or additional functions and provide results thereof to the electronic device 101. The electronic device 101 may provide the requested functions or services to another electronic device based on the received results or after additionally processing the received results. To this end cloud computing, distributed computing, or client-server computing technology may be used.

Figure 2:
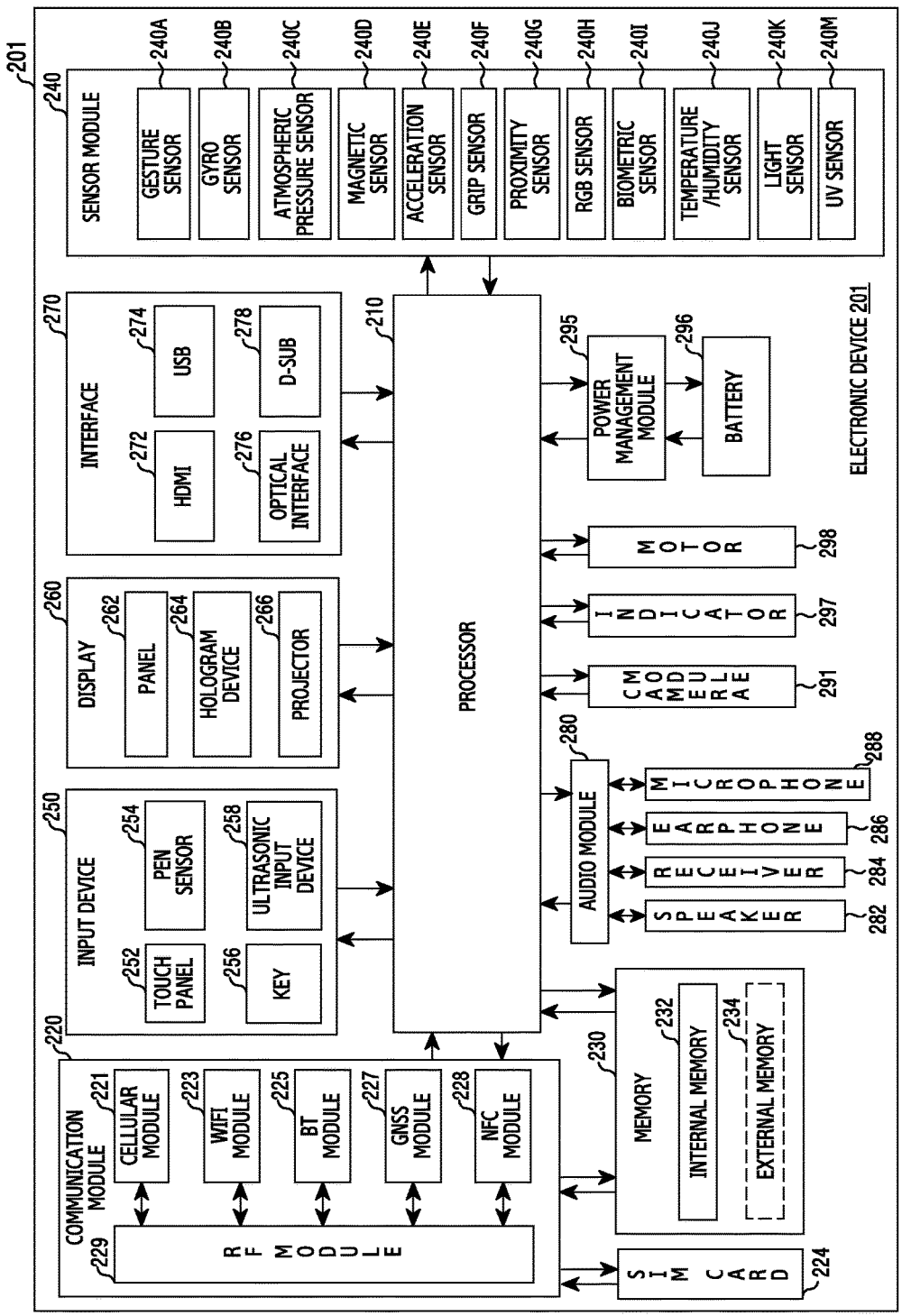
FIG. 2 is a block diagram of a configuration of an electronic device, according to an embodiment of the present disclosure.

FIG. 2 is a block diagram of a configuration of an electronic device, according to an embodiment of the present disclosure.

Referring to FIG. 2, a configuration of an electronic device 201 is provided. The electronic device 201 includes a processor (e.g., AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may drive an OS or an application to control a plurality of hardware or software elements connected to the processor 210, and perform various data processes including multimedia data and operations. The processor 210 may be implemented as a system on chip (SoC). The processor 210 may further include at least one of a graphic processing unit (GPU) or image signal processor. The processor 210 may be implemented to include at least a portion (e.g., a cellular module 221) of the above-described elements of the electronic device 201. Also, the processor 210 may store data received from at least one of other elements or generated by at least one of other elements in a non-volatile memory. The processor 210 can include a plurality of processors that are isolated operatively or physically. For one example, the processor 210 can include a first processor for determining if biometric recognition is available and a second processor for performing user authentication based on biometric recognition information.

The communication module 220 may perform data transmission/reception in communication between the electronic device 201 and other electronic devices (e.g., the external electronic device 102 or 104 or the server 106) connected via a network. The communication module 220 includes a cellular module 221, a Wi-Fi module 223, a BT module 225, a GNSS module 227, an NFC module 228, and a radio frequency (RF) module 229.

The cellular module 221 may provide voice communication, image communication, a short message service, or an Internet service, etc. via a communication network (e.g., LTE, LTE-A, CDMA, WCDMA, UMTS, WiBro, or GSM, etc.). Also, the cellular module 221 may perform identification and authentication of an electronic device within a communication network using the SIM card 224. The cellular module 221 may perform at least a portion of functions that may be provided by the processor 210. The cellular module 221 may include a CP. Also, the cellular module 221 may be implemented as an SoC. Though elements such as the cellular module 221 (e.g., a communication processor), the memory 230, or the power management module 295, etc. are illustrated as elements separated from the processor 210 in FIG. 2, the processor 210 may be implemented to include at least a portion (e.g., the cellular module 221) of the above-described elements.

Each of the Wi-Fi module 223, the BT module 225, the GPS module 227, or the NFC module 228 may include a processor for processing data transmitted/received via a relevant module. Though the cellular module 221, the Wi-Fi module 223, the BT module 225, the GNSS module 227, and the NFC module 228 are illustrated as separate blocks in FIG. 2, according to an embodiment, at least a portion (e.g., two or more elements) of the cellular module 221, the Wi-Fi module 223, the BT module 225, the GPS module 227, or the NFC module 228 may be included in one integrated circuit (IC) or an IC package. For example, at least a portion (e.g., a communication processor corresponding to the cellular module 221 and a Wi-Fi processor corresponding to the Wi-Fi module 223) of processors corresponding to each of the cellular module 221, the Wi-Fi module 223, the BT module 225, the GNSS module 227, or the NFC module 228 may be implemented as one SoC.

The RF module 229 may perform transmission/reception of data, for example, transmission/reception of an RF signal. The RF module 229 may include a transceiver, a power amp module (PAM), a frequency filter, or a low noise amplifier (LNA), etc., though not shown. Also, the RF module 229 may further include a part for transmitting/receiving an electromagnetic wave on a free space in wireless communication a conductor or a conducting line, etc. Though FIG. 2 illustrates that the cellular module 221, the Wi-Fi module 223, the BT module 225, the GNSS module 227, and the NFC module 228 share one RF module 229, according to an embodiment, at least one of the cellular module 221, the Wi-Fi module 223, the BT module 225, the GNSS module 227, and the NFC module 228 may perform transmission/reception of an RF signal via a separate RF module.

The SIM card 224 may be a card including a subscriber identity module, which may be inserted into a slot formed in a specific position of the electronic device, or may be an embedded SIM. The SIM card 224 may include unique identity information (e.g., integrated circuit card identifier (ICCID)) or subscriber information (e.g., international mobile subscriber identity (IMSI)).

The memory 230 includes an internal memory 232 or an external memory 234. The internal memory 232 may include at least one of a volatile memory (e.g., dynamic RAM (DRAM), static RAM (SRAM), synchronous dynamic RAM (SDRAM)) and a non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.).

The internal memory 232 may be a solid state drive (SSD).

The external memory 234 may include a flash drive compact flash (CF), secure digital (SD), micro secure digital (Micro-SD), mini secure digital (Mini-SD), extreme digital (xD), or a memory stick. The external memory 234 may be functionally connected with the electronic device 201 via various interfaces.

The electronic device 201 may further include a storage device (or a storage medium) such as a hard drive.

The sensor module 240 may measure a physical quantity or detect an operation state of the electronic device 201, and convert the measured or detected information to an electric signal. The sensor module 240 includes a gesture sensor 240A, a gyro sensor 240B, an atmospheric pressure sensor 240C, a magnetic sensor 240D, an acceleration sensor 240E, a grip sensor 240F, a proximity sensor 240G, a red, green, blue (RGB) sensor 240H, a biometric sensor 240I, a temperature/humidity sensor 240J, an light sensor 240K, and an ultra violet (UV) sensor 240M. Additionally or alternatively, the sensor module 240 may include an e-nose sensor, an electromyography (EMG) sensor, an electroencephalogram (EEG) sensor, an electrocardiogram (ECG) sensor, an infrared (IR) sensor, an iris sensor, or a fingerprint sensor, etc. The sensor module 240 may further include a control circuit for controlling at least one sensor belonging thereto.

The input device 250 includes a touch panel 252, a (digital) pen sensor 254, a key 256, and an ultrasonic input device 258.

The touch panel 252 may recognize a touch input using at least one of capacitive, resistive, infrared, or ultrasonic methods. Also, the touch panel 252 may further include a control circuit. A capacitive touch panel may perform detection by a physical contact or proximity recognition. The touch panel 252 may further include a tactile layer. In this case, the touch panel 252 may provide a tactile reaction to a user.

The (digital) pen sensor 254 may be implemented using a method which is the same as or similar to receiving a user's touch input, or using a separate sheet for detection. The key 256 may include a physical button, an optical key or keypad.

The ultrasonic input device 258 may recognize data by detecting a sound wave using a microphone 288 in the electronic device 201 via an input tool generating an ultrasonic signal, and enable wireless recognition.

The electronic device 201 may receive a user input from an external device (e.g., a computer or a server) connected to the communication module 220 using the communication module 220.

The display 260 includes a panel 262, a hologram device 264, and a projector 266.

The panel 262 may be a liquid crystal display (LCD), or an active-matrix organic light-emitting diode (AM-OLED), etc. The panel 262 may be implemented such that it is flexible, transparent, or wearable. The panel 262 may be configured as one module together with the touch panel 252.

The hologram device 264 may show a three-dimensional image in the air using interferences of light.

The projector 266 may project light onto a screen to display an image. The screen may be positioned inside or outside the electronic device 201. The display 260 may further include a control circuit for controlling the panel 262, the hologram device 264, or the projector 266.

The interface 270 may include a high-definition multimedia interface (HDMI) 272, a universal serial bus (USB) 274, an optical interface 276, or a D-subminiature (D-sub) 278. Additionally or alternatively, the interface 270 may include a mobile high-definition link (MHL) interface, a secure digital (SD) card/multi-media card (MMC) interface, or an infrared data association (IrDA) standard interface.

The audio module 280 may convert a sound and an electric signal in dual directions. The audio module 280 may process sound information input or output via a speaker 282, a receiver 284, an earphone 286, or the microphone 288.

The camera module 291 is a device that may shoot a still image and a moving picture. The camera module 291 may include one or more image sensors (e.g., a front sensor or a rear sensor), a lens, an image signal processor (ISP), or a flash (e.g., an LED or xenon lamp).

The power management module 295 may manage power of the electronic device 201. The power management module 295 may include a power management integrated circuit (PMIC), a charger integrated circuit (IC), or a battery gauge.

The PMIC may be mounted inside an integrated circuit or a SoC semiconductor. A charging method may be classified into a wired charging method and a wireless charging method. The charging IC may charge a battery 296 and prevent introduction of an overvoltage or an overcurrent from a charger. The charging IC may include a charging IC for at least one of the wired charging method and the wireless charging method. The wireless charging method may be a magnetic resonance method, a magnetic induction method, or an electromagnetic wave method, etc., and may additionally include an additional circuit for wireless charging, such as a coil loop, a resonance circuit, or a rectifier, etc.

The battery gauge may measure a remaining capacity, a voltage, a current, or a temperature of the battery 296. The battery 296 may store or generate electricity, and supply power to the electronic device 201 using the stored or generated electricity. The battery 296 may include, for example, a rechargeable battery or a solar battery.

The indicator 297 may display a specific state of the electronic device 201 or a portion thereof (e.g., the processor 210), for example, a booting state, a message state, or a charging state, etc.

The motor 298 may convert an electric signal to mechanical vibration.

The electronic device 201 may include a processor (e.g., a GPU) for supporting a mobile TV. The processor for supporting the mobile TV may process media data corresponding to standards such as digital multimedia broadcasting (DMB), digital video broadcasting (DVB), or media Flo, etc.

The aforementioned elements of the electronic device according to various embodiments of the present disclosure may be constituted by one or more components, and the name of the corresponding elements may vary with a type of electronic device. The electronic device may include at least one of the aforementioned elements. Some elements may be omitted or other additional elements may be further included in the electronic device. Further, some of the components of the electronic device may be combined to form a single entity, and thus, may equivalently execute functions of the corresponding elements prior to the combination.

Figure 3:
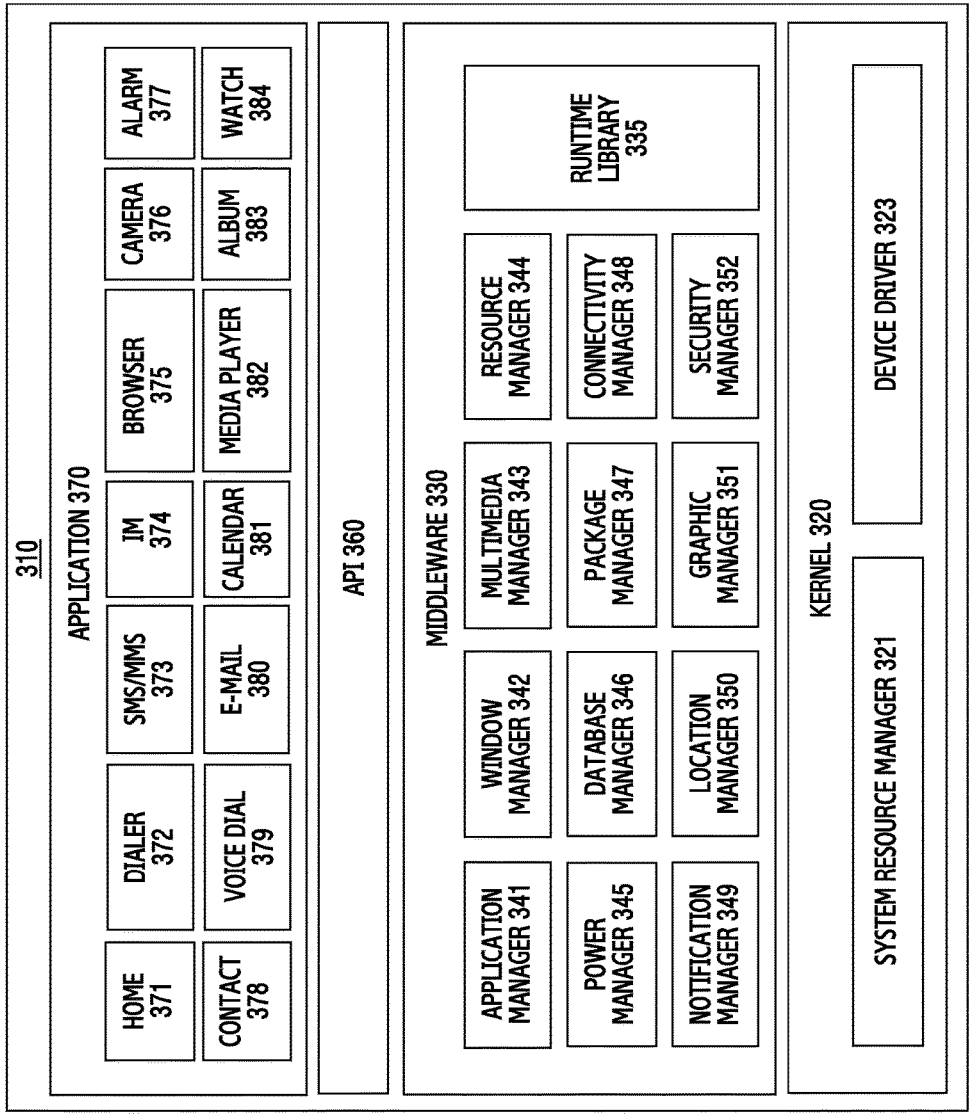
FIG. 3 is a block diagram of a configuration of a program module of an electronic device, according to an embodiment of the present disclosure.

FIG. 3 is a block diagram of a configuration of a program module of an electronic device, according to an embodiment of the present disclosure.

Referring to FIG. 3 a configuration of a program module 310 is provided. The program module 310 may include an operating system (OS) for controlling resources related to the electronic device 101 and/or various the application program 147 executed in the operating system. The operating system may be Android', iOS™, Windows', Symbian™, Tizen™, Bada™, or the like.

The program module 310 includes a kernel 320, middleware 330, an API 360, and a least one application 370. At least some of the program module 310 may be preloaded in the electronic device 100 or downloaded from the server 106.

The kernel 320 includes a system resource manager 321 or a device driver 323. The system resource manager 321 may control, allocate, or collect the system resources. The system resource manager 321 may include a process management unit, a memory management unit, or a file system management unit. The device driver 323 may include a display driver, a camera driver, a Bluetooth driver, a shared-memory driver, a USB driver, a keypad driver, a WiFi driver, an audio driver, or an inter-process communication (IPC) driver.

The middleware 330 may provide a function required by the application 370 in common or provide various functions to the application 370 through the API 360 so that the application 370 can efficiently use limited system resources within the electronic device 101. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add new functions through a programming language while the application 370 is executed. The runtime library 335 may perform input/output management, memory management, or an arithmetic function.

The application manager 341 may manage a life cycle of at least one application 370.

The window manager 342 may manage graphical user interface (GUI) resources used by a screen.

The multimedia manager 343 may recognize formats required for the reproduction of various media files, and may perform an encoding or decoding of the media file by using a codec suitable for the corresponding format.

The resource manager 344 may manage resources, such as a source code, a memory, and a storage space of at least one application 370.

The power manager 345 may operate together with a basic input/output system (BIOS) to manage a battery or power and may provide power information required for the operation of the electronic device 101.

The database manager 346 may generate, search for, or change a database to be used by at least one application 370.

The package manager 347 may manage the installation or the updating of at least one application 370 distributed in the form of package file.

The connectivity manager 348 may manage wireless connection of Wi-Fi or Bluetooth.

The notification manager 349 can display or notify of an event such as an arrival message, promise, proximity notification, and the like in such a way that does not disturb a user.

The location manager 350 may manage location information of the electronic device 101.

The graphic manager 351 may manage graphic effects to be provided to a user and user interfaces related to the graphic effects.

The security manager 352 may provide all security functions required for system security or user authentication.

When the electronic device 101 has a call function, the middleware 330 may further include a telephony manager for managing a voice call function or a video call function of the electronic device 101.

The middleware 330 may include a middleware module for forming a combination of various functions of the aforementioned components. The middleware 330 may provide modules specialized according to types of operating systems in order to provide differentiated functions. Further, the middleware 330 may dynamically remove some of the existing components or add new components.

The API 360 is a set of API programming functions, and a different configuration thereof may be provided according to an operating system. For example, Android™ or iOS™ may provide one API set per platform, and Tizen™ may provide two or more API sets per platform.

The application 370 may include one or more applications which can provide functions such as home 371, dialer 372, short-message service (SMS)/multi-media messaging service (MMS) 373, instant message (IM) 374, browser 375, camera 376, alarm 377, contacts 378, voice dialer 379, email 380, calendar 381, media player 382, album 383, and a watch 384. The application 370 may additionally or alternatively include an application which provides a health care function (e.g., to measure an exercise quantity or a blood sugar level), or environment information (e.g., atmospheric pressure, humidity, or temperature information).

The applications 370 may include an information exchange application supporting information exchange between the electronic device 101 and an external electronic device. The information exchange application may include a notification relay application for transferring predetermined information to an external electronic device or a device management application for managing an external electronic device.

For example, the notification relay application may include a function of transferring, to the external electronic device, notification information generated from other applications of the electronic device 101 (for example, an SMS/MMS application, an e-mail application, a health management application, or an environmental information application). Further, the notification relay application may receive notification information from a control device and provide the received notification information to the user. The device management application may manage (for example, install, delete, or update) a function for at least a part of the external electronic device communicating with the electronic device 101 (for example, turning on/off the external electronic device itself (or some elements thereof) or adjusting brightness (or resolution) of a display), applications executed in the external electronic device, or services provided from the external electronic device (for example, a telephone call service or a message service).

The application 370 may include an application (for example, health management application) designated according to attributes of the external electronic device (such as the type of electronic device which corresponds to a mobile medical device). The application 370 may include an application received from the external electronic devices (for example, the server 106 or the external electronic device 102 or 104).

The application 370 may include a preloaded application or a third party application which can be downloaded from the server. The names of the components of the program module 310 may vary according to the type of operating system.

At least some of the program module 310 may be implemented by software, firmware, hardware, or a combination thereof. At least some of the program module 310 may be implemented (for example, executed) by the processor 120 (for example, the application program). At least some of the program module 310 may include a module, program, routine, sets of instructions, or process for performing one or more functions.

The term "module" as used herein may refer to a unit including one of hardware, software, and firmware or a combination of them. The term "module" may be interchangeably used with the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" may include at least one of an application-specific integrated circuit (ASIC) chip, a field-programmable gate arrays (FPGA), and a programmable-logic device for performing operations which has been known or are to be developed hereinafter.

At least some of the devices (for example, modules or functions thereof) or the method (for example, operations) according to the present disclosure may be implemented by a command stored in a computer-readable storage medium in a programming module form. The instruction, when executed by the processor 120, may cause the processor to execute the function corresponding to the instruction. The computer-readable storage medium may be the memory 130.

The computer readable storage medium may include a hard disk, a floppy disk, magnetic media (e.g., a magnetic tape), optical media (e.g., a compact disc read only memory (CD-ROM) and a DVD), magneto-optical media (e.g., a floptical disk), a hardware device (e.g., a ROM, a random access memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module may include one or more of the aforementioned components or may further include other additional components, or some of the aforementioned components may be omitted. Operations executed by a module, a programming module, or other component elements, may be executed sequentially, in parallel, repeatedly, or in a heuristic manner. Further, some operations may be executed according to another order or may be omitted, or other operations may be added.

Figure 4A:
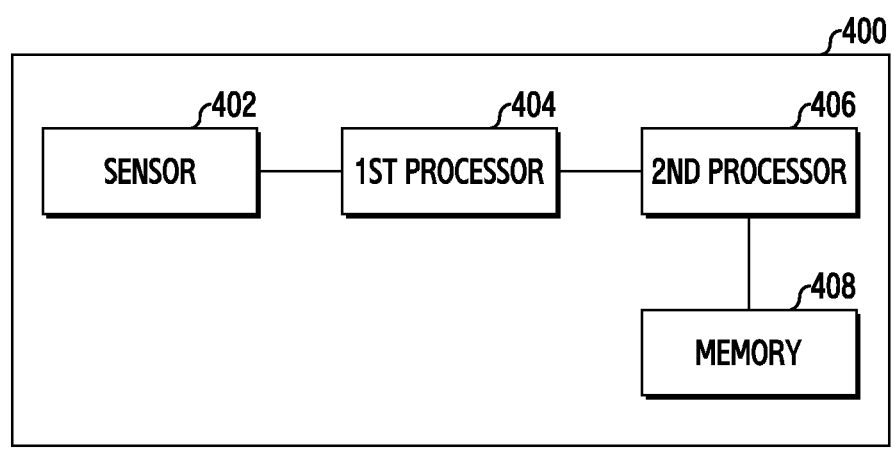
FIGS. 4A and 4B are block diagrams of an electronic device for selectively performing user authentication, according to an embodiment of the present disclosure.
Figure 4B:
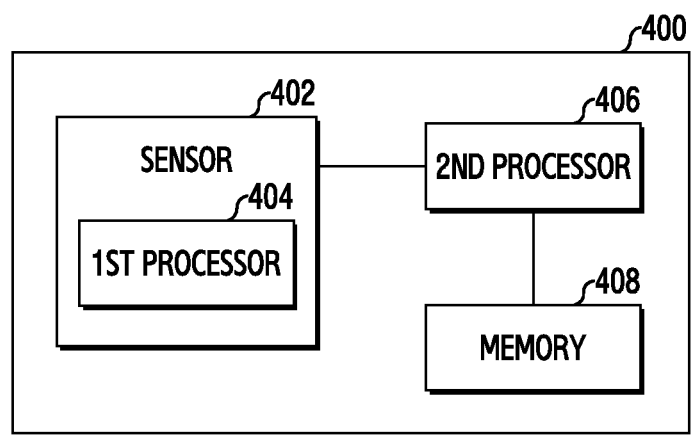

FIGS. 4A and 4B are block diagrams of an electronic device for selectively performing user authentication, according to an embodiment of the present disclosure.

Referring to FIG. 4A and FIG. 4B, an electronic device 400 is provided. The electronic device 400 includes a sensor 402, a first processor 404, a second processor 406, and a memory 408.

The sensor 402 can include at least one sensor capable of acquiring biometric data (e.g., fingerprint data) from an object (e.g., the body, clothes, an input device, etc.) that comes in contact with the sensor 402. For instance, the at least one sensor can include a touch sensor, a finger scan sensor, etc.

The sensor 402 can detect sensing information about an object that comes in contact with the sensor 402. For one example, the sensor 402 can consist of a pixel array that includes a plurality of pixels (or electrodes). Each pixel can detect a quantity of charge that is induced by the object. The sensor 402 can detect a quantity of charge for a point that is formed by an intersection of at least one transmission (TX) line (e.g., driver electrode) and at least one reception (RX) line (e.g., sensing electrode). For one example, the sensor 402 can be positioned in a home button of the electronic device 400 and/or a rear surface or lateral surface of the electronic device 400. Alternatively, the sensor 402 can be included in at least a partial region of a display of the electronic device 400.

The sensor 402 can dynamically activate at least one pixel for detecting a quantity of charge, to adjust a sensing range of the sensor 402.

For example, when the first processor 404 operates in a first mode for determining contact or non-contact of an object with the sensor 402, the sensor 402 can activate at least one pixel included in a first pixel set among pixels included in the sensor 402, to detect sensing information about the object. When the sensor 402 detects the sensing information about the object through the pixels included in the first pixel set, the sensor 402 can provide the corresponding sensing information to the first processor 404. When the first processor 404 operates in a second mode for determining if biometric data acquisition is available, the sensor 402 can activate pixels included in a second pixel set among the pixels included in the sensor 402, to detect sensing information about the object. When the sensor 402 detects the sensing information about the object through the pixels included in the second pixel set, the sensor 402 can provide the corresponding sensing information to the first processor 404. For instance, the number of the pixels included in the second pixel set can be the same as or greater than the number of the pixels included in the first pixel set.

When the second processor 406 operates in an authentication mode, the sensor 402 can activate all of the pixels included in the sensor 402, to detect sensing information about the object. When the sensor 402 detects the sensing information about the object through the activated pixels, the sensor 406 can provide the corresponding sensing information to the second processor 406.

The first processor 404 and the second processor 406 can be isolated logically or physically and be operated mutually independently. For example, the first processor 404 can be a low power processor whose consumption power is less than that of the second processor 406. For instance, the first processor 404 can include a Micro Controller Unit (MCU) that is a low power processor. The second processor 406 can include an application processor that is a high power processor. For instance, the first processor 404 can include a sensor hub that can collect and process sensing information detected in the sensor 402.

The first processor 404 can determine if it can perform an authentication procedure (e.g., if it can acquire biometric data), based on sensing information detected through at least a part of the sensor 402. For example, the first processor 404 can control the sensor 402 to operate in a first mode for determining contact or non-contact of an object for biometric recognition. For instance, the first processor 404 can control the sensor 402 to activate some pixels included in the first pixel set among a plurality of pixels included in the sensor 402. If the first processor 404 senses a change of a quantity of charge through the pixels included in the first pixel set, the first processor 404 can determine if the object for biometric recognition has come in contact with the sensor 402. For example, if the first processor 404 determines that the object comes in contact through the first pixel set, the first processor 404 can convert into a second mode for determining if biometric data acquisition is available. For instance, the first processor 404 can control the sensor 402 to activate pixels included in the second pixel set among a plurality of pixels included in the sensor 402.

The first processor 404 can determine if a partial region of the body capable of detecting the fingerprint has come in contact, using sensing information that is sensed through the pixels included in the second pixel set. For example, the first processor 404 can detect a fingerprint pattern of the body region, based on a charge quantity difference between a pixel corresponding to a ridge of the fingerprint and a pixel corresponding to a valley between the ridges. Accordingly to this, the first processor 404 can determine if at least a part of the body capable of detecting the fingerprint pattern has come in contact, based on a charge quantity difference between pixels included in the second pixel set.

If the first processor 404 determines the contact of the body including the fingerprint through the pixels included in the second pixel set, the first processor 404 can determine that the biometric data acquisition is available. For example, if the biometric data acquisition is available through an object that comes in contact with the sensor 402, the first processor 404 can process such that an authentication operation is carried out by the second processor 406. For instance, the first processor 404 can control the sensor 402 to activate all of the pixels included in the sensor 402. In this case, if the biometric data acquisition is available, the first processor 404 can activate the second processor 406 and process such that the authentication procedure is performed by the second processor 406. Alternatively, if the biometric data acquisition is available through the object that comes in contact with the sensor 402, the first processor 404 can control the second processor 406 to activate the pixels included in the sensor 402.

The second processor 406 can perform a user authentication procedure, using the sensor 402 having all of the pixels activated for detecting a quantity of charge. For example, the second processor 406 can detect a user's biometric data (e.g., fingerprint), based on sensing information acquired through the sensor 402. For instance, the second processor 406 can generate a fingerprint image including a ridge and a valley between the ridges, based on the quantity of charge detected through the respective pixels. The second processor 406 can compare the biometric data corresponding to the sensing information with preset criterion biometric data, to determine user authentication or non-authentication.

When the user is authenticated, the second processor 406 can control to execute a previously designated function of the electronic device 400. For example, the second processor 406 can process to release a screen lock state.

When biometric data is acquired, the second processor 406 can control to execute a function corresponding to additional information that is additionally detected through the sensor 402. For instance, the additional information can include at least one of a pressure to an object, a pressure (or an input) maintenance time, and/or a pressure (or an input) area.

If the first processor 404 determines that biometric data acquisition is available through a contact object, the second processor 406 can control the sensor 402 to activate all of the pixels included in the sensor 402.

The memory 408 can store at least one program for an operation of the electronic device 400. The memory 408 can store data that is generated by executing at least one program. For example, the memory 408 can store information required for authentication procedure execution. For instance, the information required for the authentication procedure execution can include a fingerprint image that is registered by a user.

As shown in FIG. 4B, the first processor 404 is included in the sensor 402. In this case, the sensor 402 including the first processor 404 performs an operation of determining the execution or non-execution of an authentication procedure.

And, the second processor 406 can perform the authentication procedure, based on the determination result of the sensor 402.

As described hereinafter, the first processor 404 and the second processor 406 are configured as separate elements; however, the first processor 404 and the second processor 406 can operate as one processor in which regions are divided as well. For example, one processor may be divided into a security region and a general region. The general region is driven independently from the security region and performs an operation of determining the execution or non-execution of an authentication procedure. The security region can perform the authentication procedure, based on the determination result of the general region as well.

An electronic device according to an embodiment can include a first processor, a second processor, a display, and a finger scan sensor. The first processor can be set to receive an input through the finger scan sensor while the display is in a deactivated state, and transmit the input to the second processor, when the input has a biometric data related feature. The second processor can be set to authenticate a user's biometric data by using the input, and activate the display if the authentication succeeds.

The second processor can be set to release a lock state of the display based on the authentication success, when the display is in the lock state.

The second processor can be set to change from a deactivated state to an activation state in response to receiving the input from the first processor.

The finger scan sensor can include a first pixel set comprised of some pixels of the finger scan sensor and a second pixel set different from the first pixel set. For example, the first processor can be set to sense at least a part of the received input through the first pixel set, and the second processor can be set to authenticate the received biometric data through the second pixel set. For instance, the second pixel set can include a larger number of pixels than the first pixel set.

The finger scan sensor can be set to transmit the input to the first processor, when a pixel of the first pixel set senses that at least part of the input satisfies a first range. For example, the satisfying of the first range can be a situation in which an input is sensed by the finger scan sensor.

The finger scan sensor can be set to transmit the input to the first processor, when a pixel of the first pixel set sense that the at least part of the input satisfies a second range. For example, the satisfying of the second range can be a situation in which an input having a biometric data related feature is sensed.

The electronic device can include a sensor different from the finger scan sensor in a region adjacent to the finger scan sensor. For example, the second processor can be set to, after activating the display, execute a function corresponding to additional information that is received using the other sensor.

The electronic device can include a touch sensor or a pressure sensor.

The first processor can include a processor having a lower processing capability than the second processor.

Figure 5:
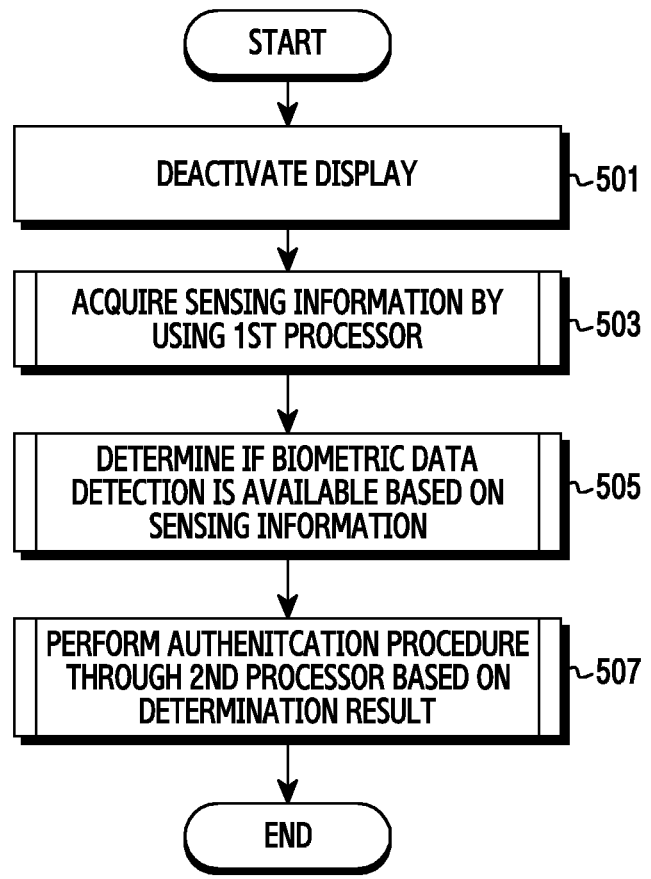
FIG. 5 is a flowchart of a procedure for performing a user authentication operation in an electronic device, according to an embodiment of the present disclosure.

FIG. 5 is a flowchart of a procedure for performing a user authentication operation in an electronic device, according to an embodiment of the present disclosure.

Referring to FIG. 5 a procedure of performing a user authentication operation in the electronic device 400 is described.

At step 501, the electronic device 400 deactivates a display of the electronic device 400. For example, when the electronic device 400 operates in a low power mode, the electronic device 400 can deactivate the display. For instance, deactivating the display can include powering off the display or operating the display in a predefined scheme (e.g., a resolution decrease scheme, a screen brightness decrease scheme, etc.). In this case, the electronic device 400 can operate in the low power mode, thereby activating the first processor 404 for determining if it can perform an authentication procedure, and deactivating the second processor 406 for performing the authentication procedure. For instance, the first processor 404 can be a processor whose power consumption is less than that of the second processor 406.

At step 503, in a state in which the display is deactivated, the electronic device 400 acquires sensing information through at least a part of the sensor 402 controlled by the first processor 404. For example, at least part of the sensor 402 can include some pixels among a plurality of pixels included in the sensor 402.

At step 505, the electronic device 400 determines whether biometric data detection is available, based on the sensing information that is acquired using at least part of the sensor 402. For example, the first processor 404 of the electronic device 400 can check pixels that have detected a ridge and a valley between the ridges, using the sensing information sensed through at least part of the sensor 402. For instance, when the ridge and the valley between the ridges can be detected using the sensing information acquired through at least part of the sensor 402, the first processor 404 determines that the biometric data acquisition is available.

At step 507, the electronic device 400 performs the authentication procedure by using the second processor 406, based on a result of determining whether the biometric data detection is available. For example, when the electronic device 400 determines that the biometric data detection is available, the electronic device 400 can activate all of the pixels included in the sensor 402 through the control of the first processor 404. The electronic device 400 can acquire sensing information through the activated pixels of the sensor 402. The second processor 406 of the electronic device 400 can detect user's biometric data (e.g., fingerprint), based on the acquired sensing information, and compare the detected biometric data with preset criterion biometric data. For instance, the second processor 406 can generate a fingerprint image including a ridge and a valley between the ridges, based on a quantity of charge detected through the respective pixels, and compare the generated fingerprint image with a stored image.

Figure 6:
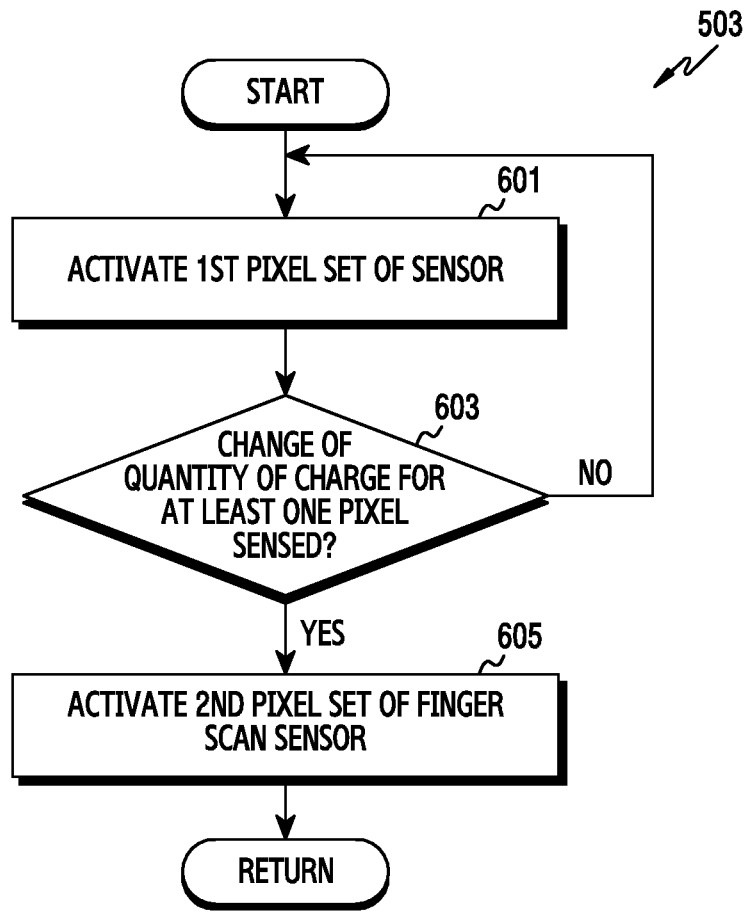
FIG. 6 is a flowchart of a procedure for determining contact or non-contact of an object with a sensor, using a first processor of an electronic device, according to an embodiment of the present disclosure.
Figure 8A:
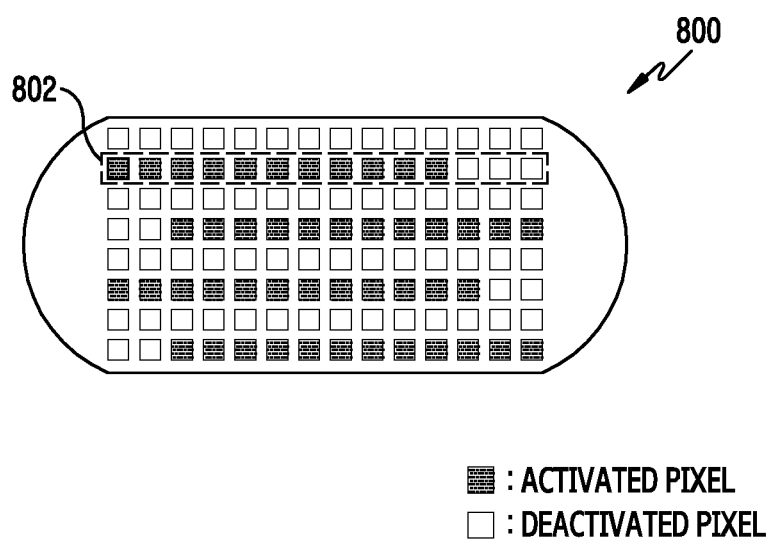
FIGS. 8A and 8B illustrate a second pixel set of a sensor of an electronic device, according to an embodiment of the present disclosure.
Figure 8B:
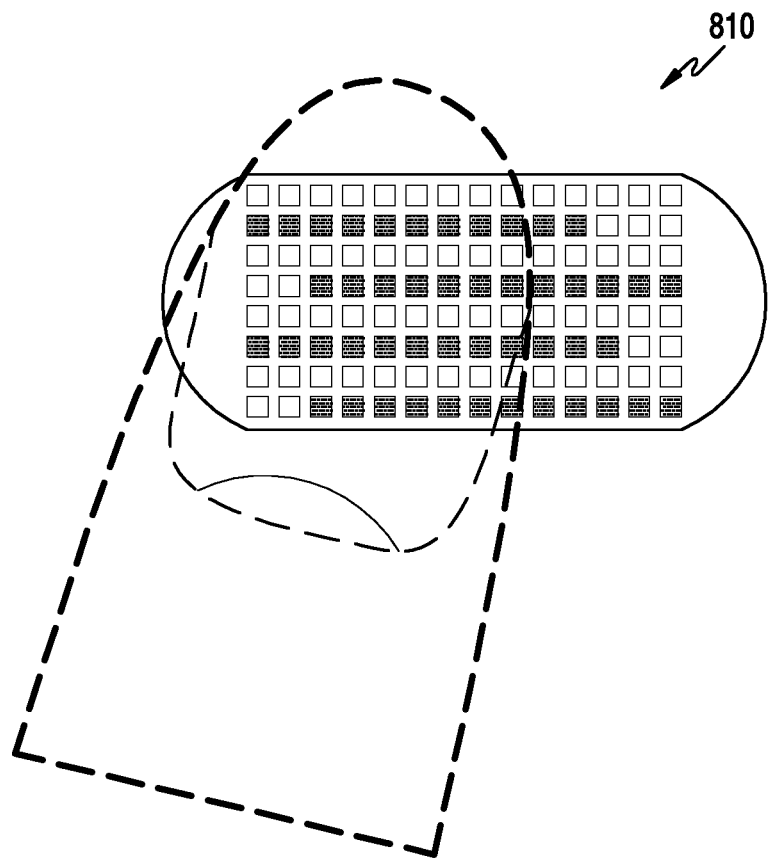
Figure 9:
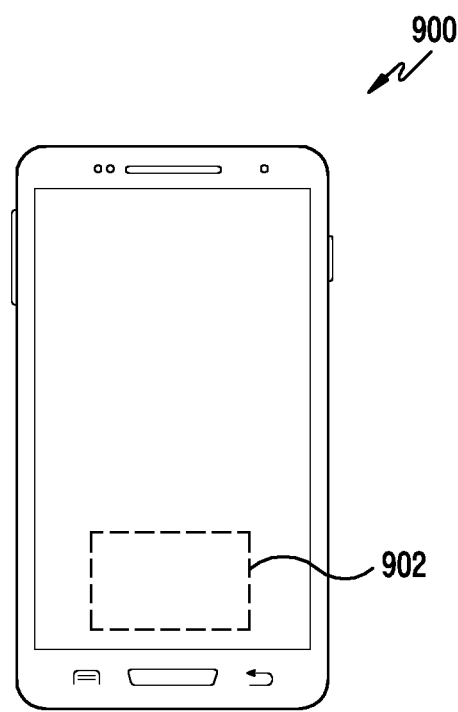
FIG. 9 illustrates guide information for a first set of pixels of a sensor of an electronic device, according to an embodiment of the present disclosure.

FIG. 6 is a flowchart of a procedure for determining contact or non-contact of an object with a sensor, using a first processor of an electronic device, according to an embodiment of the present disclosure. FIGS. 7A to 7D illustrate a first pixel set of a sensor of an electronic device, according to an embodiment of the present disclosure. FIGS. 8A and 8B illustrate a second pixel set of a sensor of an electronic device, according to an embodiment of the present disclosure. FIG. 9 illustrates guide information for a first set of pixels of a sensor of an electronic device, according to an embodiment of the present disclosure.

Referring to FIGS. 6, 7A to 7D, 8A to 8B, and 9, a procedure for acquiring sensing information using the first processor 404 of the electronic device 400, as described with respect to step 503 of FIG. 5, is described in further detail.

At step 601, when a display is deactivated (e.g., in step 501 of FIG. 5), the first processor 404 activates a first pixel set of the sensor 402 (e.g., finger scan sensor).

Figure 7A:
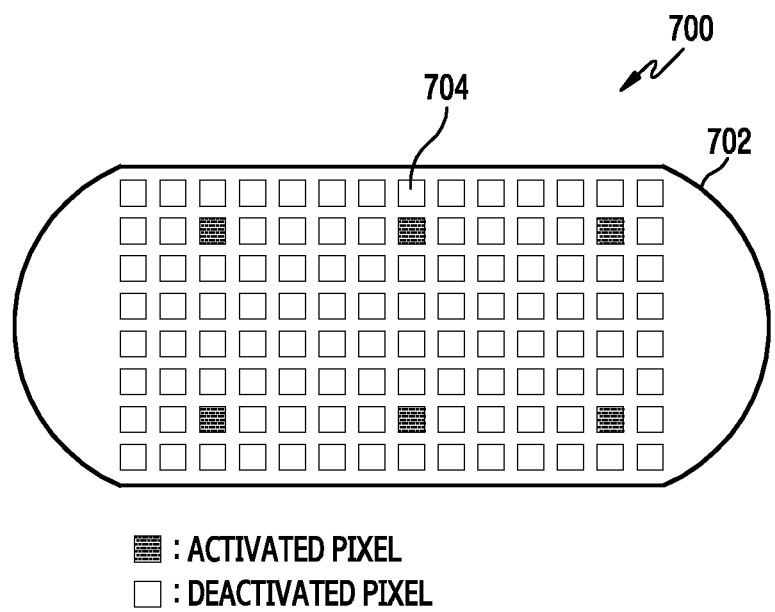
FIGS. 7A to 7D illustrate a first pixel set of a sensor of an electronic device, according to an embodiment of the present disclosure.

For example, as shown in FIG. 7A, the sensor 402 can be arranged in a rear surface of a home button 702, and can consist of a pixel array 700 that includes a plurality of pixels 704. When the first processor 404 operates in a first mode for determining contact or non-contact of an object with the sensor 402, the first processor 404 can control the sensor 402 to activate some pixels (e.g., pixels corresponding to approximately 1% or less of the plurality of pixel 704), i.e., a first pixel set among the plurality of pixels 704 included in the sensor 402.

Figure 7B:
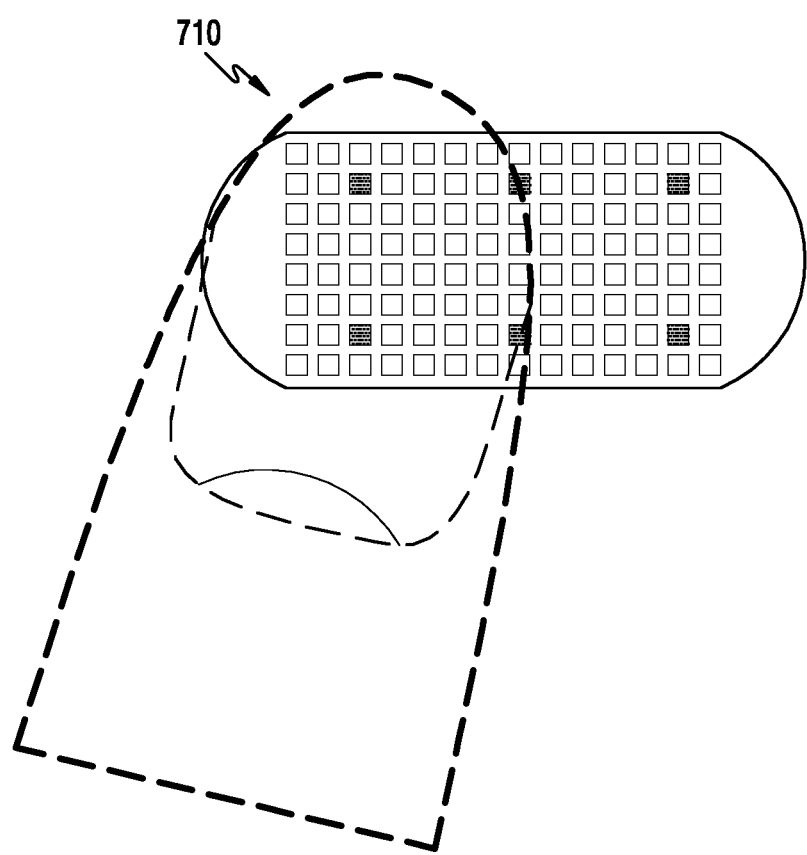
Figure 7C:
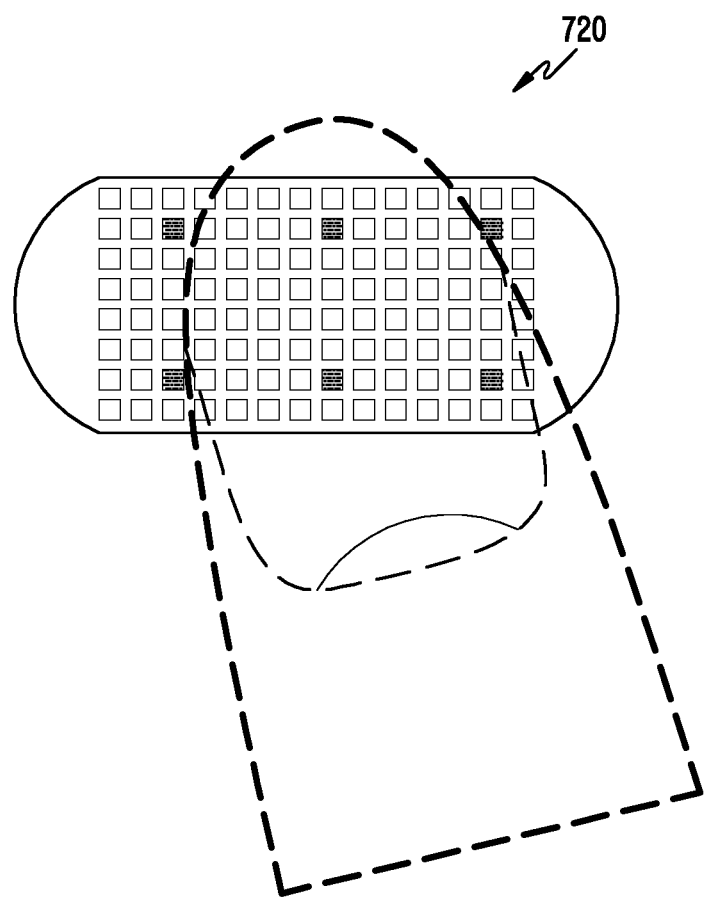

In this case, the first processor 404 can control such that the remaining pixels not included in the first pixel set maintain a deactivated state. For example, the first processor 404 can activate at least one pixel capable of determining if an object comes in contact with the home button 702. For instance, the activated pixel can be arranged to sense the object 710 coming in contact with a left portion of a home button 702, as shown in FIG. 7B, and an object 720 coming in contact with a right portion of the home button 702, as shown in FIG. 7C.

Figure 7D:
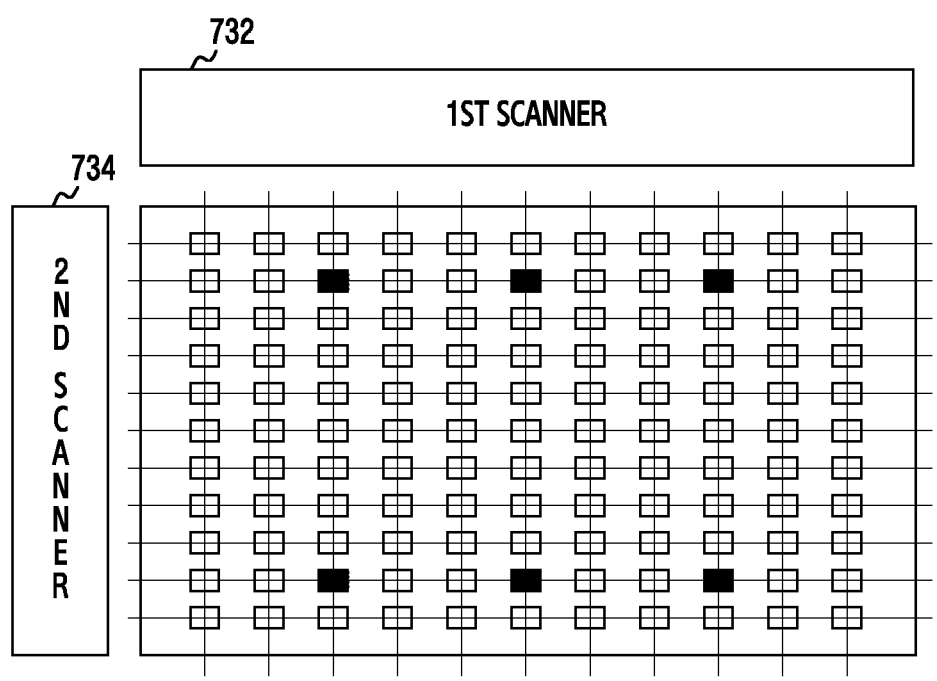

Alternatively, the sensor 402 can be a sensor of a form different from that of a sensor that consists of a pixel array. For instance, as shown in FIG. 7D, the sensor 402 can be constructed to detect a quantity of charge for a point that is formed by an intersection of at least one TX line (e.g., driver electrode) and at least one RX line (e.g., sensing electrode). For instance, points detecting the quantity of charge can be coupled with a first scanner 732 scanning a pixel array in a first direction (e.g., vertical direction) and a second scanner 734 scanning the pixel array in a second direction (e.g., horizontal direction).

At step 603, the first processor 404 determines whether at least one pixel included in the first pixel set senses a change of a quantity of charge. For example, the first processor 404 can check if a pixel sensing the change of the charge quantity among the pixels included in the first pixel set exists.

When at least one pixel does not sense a change of the charge quantity at step 603, the first processor 404 can return to step 601, or can alternatively return to step 603 and re-perform the operation of sensing a change of a quantity of charge for at least one pixel.

When at least one pixel senses a change of the charge quantity at step 603, the first processor 404 proceeds to step 605 and activates a second pixel set of the sensor 402 in order to convert into a second mode for determining whether biometric data acquisition is available. For example, the number of pixels included in the second pixel set can be the same as the number of pixels included in the first pixel set, or can be greater than the number of pixels included in the first pixel set. For instance, as shown in FIG. 8A, in the second pixel set, a pixel set 802 including a plurality of pixels, each of which can be arranged consecutively or non-consecutively within the entire region of the sensor 402. For example, the pixels included in the pixel set 802 can be arranged consecutively or alternately, based on a detection sensitivity (or resolution) of the sensor 402. For instance, as shown in FIG. 8B, the first processor 404 can sense an object 810 by detecting a difference of a quantity of charge between pixels corresponding to a ridge of a fingerprint and a valley between the ridges through the pixels of the second pixel set.

After activating the second pixel set, the first processor 404 can operate in a second mode for determining whether biometric data acquisition is available. For example, the first processor 404 can perform the operation associated with step 505 of FIG. 5.

The first processor 404 can reduce a battery consumption amount of the electronic device 400 by activating the first pixel set of the sensor 402 as well.

The sensor 402 can be embedded in a display of the electronic device 400 as well. In this case, the first processor 404 can control the sensor 402 to activate some pixels, i.e., a first pixel set, among a plurality of pixels included in the sensor 402 embedded in the display. Further, by outputting 900 guide information 902 representing the first pixel set, as shown in FIG. 9, a user can recognize the activated first pixel set. For example, the first processor 404 can output guide information in the form of a voice, a text, an image, an icon, etc. The guide information can include information about a position, area, etc. of the first pixel set.

Figure 10:
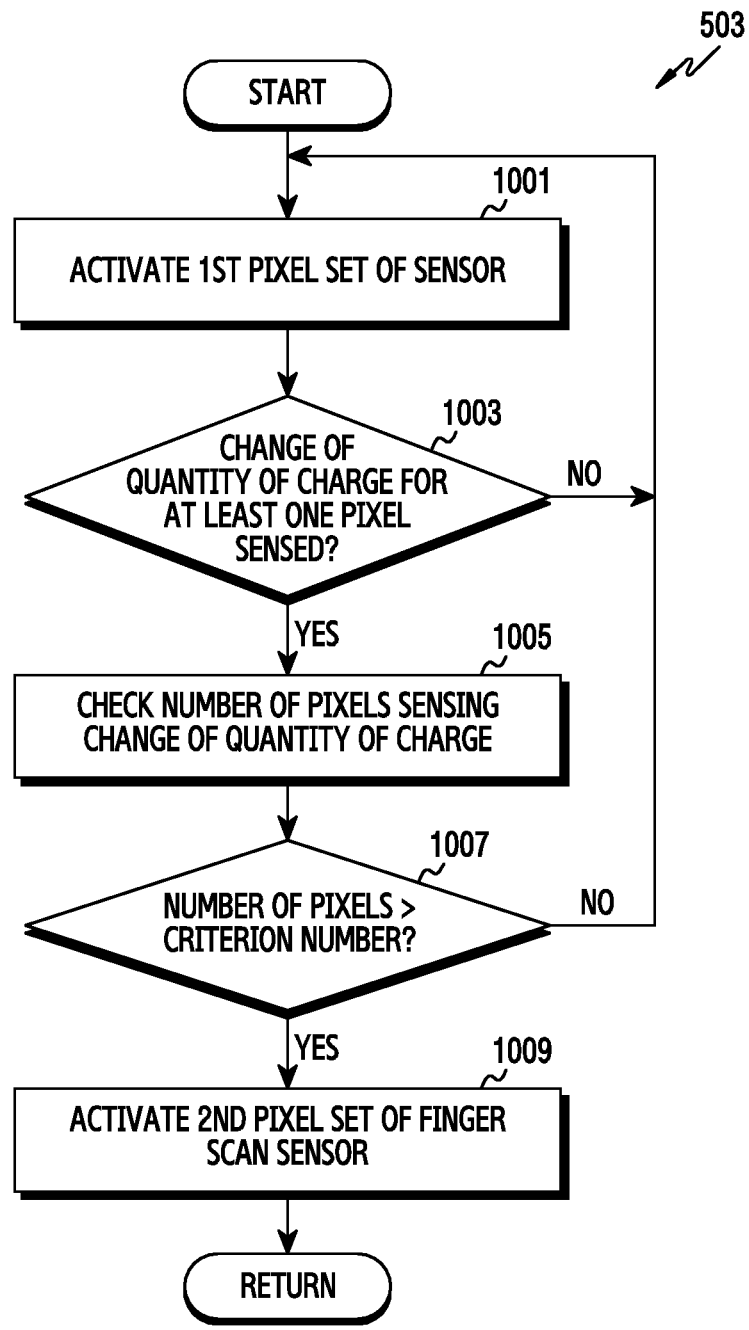
FIG. 10 is a flowchart a procedure for determining contact or non-contact of an object with a sensor, using a first processor of an electronic device, according to an embodiment of the present disclosure.

FIG. 10 is a flowchart of a procedure for determining contact or non-contact of an object with a sensor, using a first processor of an electronic device, according to an embodiment of the present disclosure.

Referring to FIG. 10, another procedure for acquiring sensing information using the first processor 404 of the electronic device, as described with respect to step 503 of FIG. 5, is described in further detail.

At step 1001, the first processor 404 activates a first pixel set of the sensor 402. For example, when the first processor 404 operates in a first mode for determining contact or non-contact of an object with the sensor 402, the first processor 404 can control the sensor 402 to activate some pixels (e.g., pixels corresponding to approximately 1% or less of the entire pixel), i.e., the first pixel set among a plurality of pixels included in the sensor 402 and deactivate the remaining pixels.

At step 1003, the first processor 404 determines whether at least one pixel included in the first pixel set senses a change of a quantity of charge. For example, the first processor 404 can determine if the change of the charge quantity is sensed for at least one pixel included in the first pixel set, due to the contact of the object.

When at least one pixel does not sense a change of the charge quantity at step 1003, the first processor 404 can return to step 1001, or can alternatively return to step 1003 and re-perform the operation of determining whether at least one pixel senses a change of a quantity of charge. When at least one pixel senses a change of the charge quantity at step 1003, the first processor 404 proceeds to step 1005 and checks the number of pixels sensing a change of a quantity of charge. For example, the first processor 404 can check the number of pixels that sense a change of a quantity of charge among pixels of the activated first pixel set.

At step 1007, the first processor 404 determines whether the number of the pixels sensing a change of the charge quantity exceeds a predefined criterion number. For example, the first processor 404 can compare the number of the pixels sensing the change of the charge quantity with the criterion number to determine whether the electronic device 400 should convert into a second mode for determining if biometric data acquisition is available.

When the first processor 404 determines that a number of pixels less than the criterion number have sensed a change of the charge quantity at step 1007, the first processor 404 can maintain an operation of the first mode of determining contact or non-contact of the object with the sensor 402. In this case, the first processor 404 can perform the operation associated with step 1001.

When the first processor 404 determines that a number of pixels greater than or equal the criterion number have sensed a change of the charge quantity at step 1007, the first processor 404 proceeds to step 1009 and activates the second pixel set of the sensor 402 in order to convert into the second mode. For example, the first processor 404 can activate the second pixel set to include a number of pixels greater than the number of pixels included in the first pixel set.

Accordingly, the first processor 404 can prevent the unnecessary activation of the second pixel set of the sensor 402, based on the number of pixels sensing the change of the charge quantity.

Figure 11:
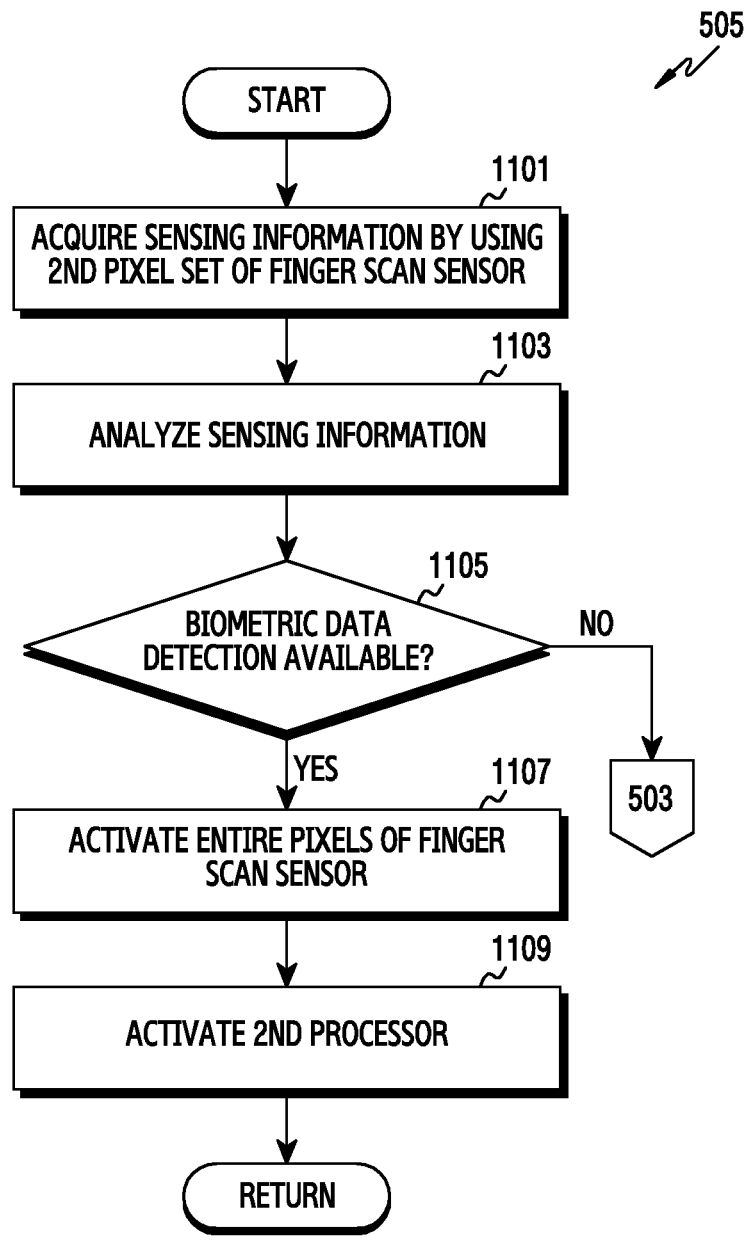
FIG. 11 is a flowchart of a procedure for determining whether biometric data acquisition is available in an electronic device, according to an embodiment of the present disclosure.
Figure 12A:
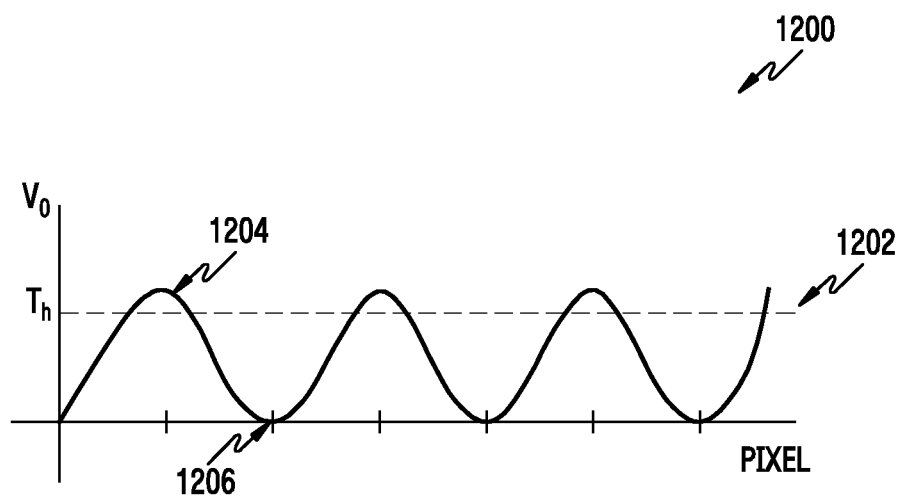
FIGS. 12A to 12C are graphs representing the detection of a pattern of biometric data, according to an embodiment of the present disclosure.
Figure 12B:
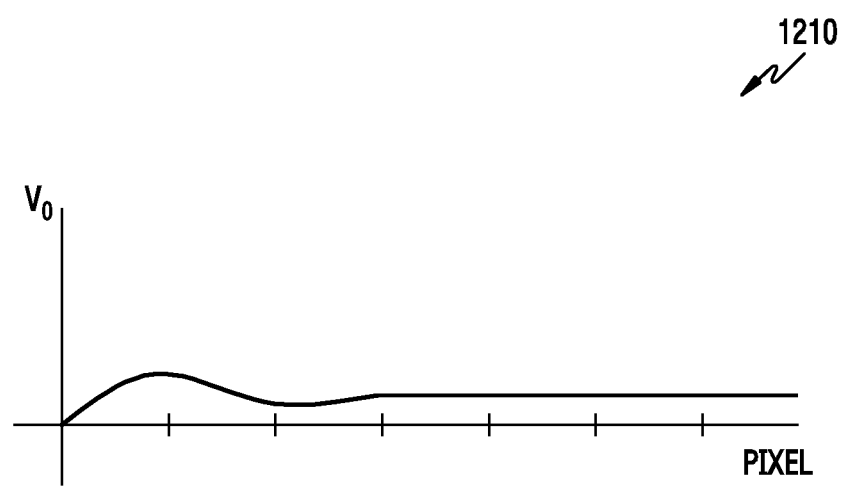
Figure 12C:
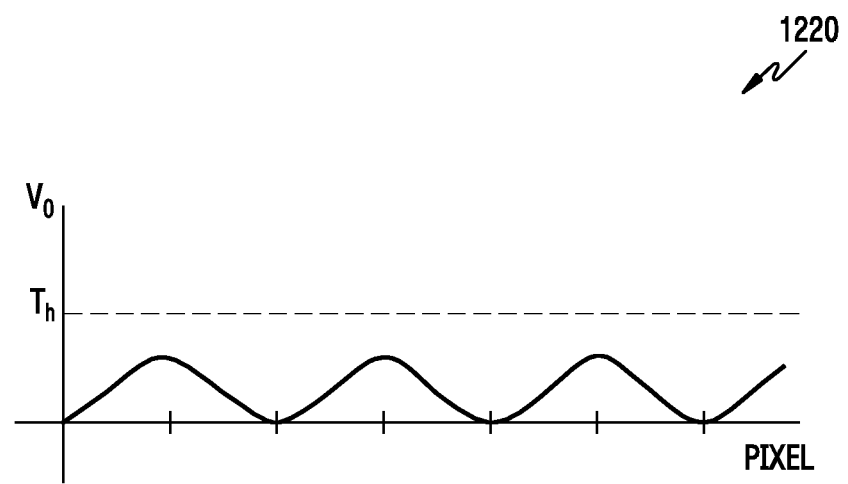
Figure 13:
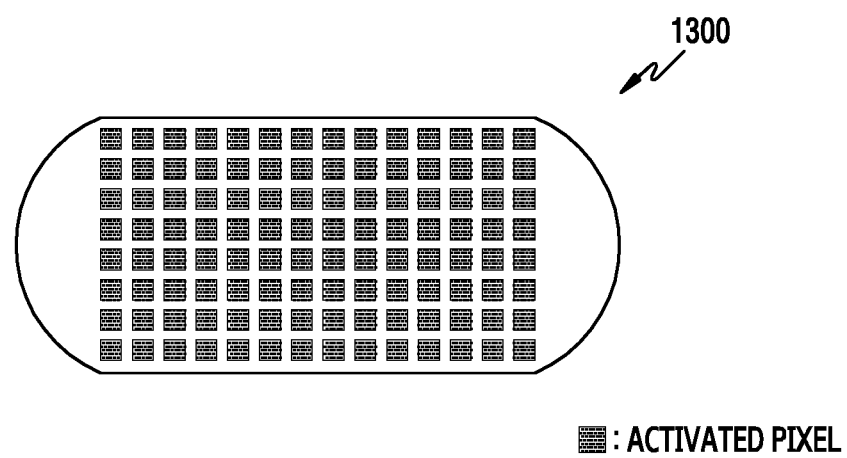
FIG. 13 is a diagram of a sensor for performing an authentication operation in an electronic device, according to an embodiment of the present disclosure.

FIG. 11 is a flowchart of a procedure for determining whether biometric data acquisition is available in an electronic device, according to an embodiment of the present disclosure. FIGS. 12A to 12C are graphs representing the detection of a pattern of biometric data, according to an embodiment of the present disclosure. FIG. 13 is a diagram of a sensor for performing an authentication operation in an electronic device, according to an embodiment of the present disclosure.

Referring to FIGS. 11, 12A to 12C, and 13, a procedure for determining if biometric data detection is available based on sensing information using a first processor 404 of the electronic device 400, as described with respect to step 505 of FIG. 5, is described in further detail.

At step 1101, the first processor 404 acquires sensing information through the second pixel set of the sensor 402.

At step 1103, the first processor 404 analyzes the sensing information that is acquired through the second pixel set. For example, the first processor 404 can check whether a biometric data pattern (i.e., biometric data related feature) can be detected, using the sensing information acquired through the second pixel set.

At step 1105, the first processor 404 determines whether biometric data acquisition is available based on the analysis result. When the first processor 404 detects a change of a quantity of charge between pixels by using the sensing information that is sensed through the pixels included in the second pixel set, the first processor 404 can determine that the biometric data acquisition is available.

For example, when an object that is a fingertip, comes in contact with the sensor 402, the first processor 404 can, check an output value (Vo) 1204 of a pixel detecting a valley of the fingerprint and an output value (Vo) 1206 of a pixel detecting a ridge, as shown in FIG. 12A. The displacement deviation of the output value can occur between the pixel detecting the ridge and the pixel detecting the valley. When the first processor 404 detects the displacement deviation of the output value between the pixels, the first processor 404 can determine whether the biometric data acquisition is available. For instance, when the first processor 404 detects an output value satisfying a threshold value 1202, the first processor 404 determines that a fingerprint is recognized and the biometric data acquisition is available. The threshold value can be associated with a permittivity of the body.

Contrarily, when an object that is not a fingertip comes in contact with the sensor 402, the first processor 404 can check output values 1210 of pixels having constant displacements, as shown in FIG. 12B. In this case, the first processor 404 determines that the biometric data acquisition is unavailable.

When a fingerprint that is not from a human body comes in contact with the sensor 402, the first processor 404 can detect the displacement deviation of an output value 1220 between pixels, as shown in FIG. 12C. However, because the fingerprint is not actually a part of the body, the output values of the respective pixels may not satisfy the threshold value. For instance, when the first processor 404 detects the output value failing to satisfy the threshold value, the first processor 404 can determine that the biometric data acquisition is unavailable.

When it is determined that the biometric data detection is not available at step 1105, the first processor 404 can perform an operation of determining the execution or non-execution of an authentication procedure. For example, the first processor 404 can maintain an operation of a first mode for determining contact or non-contact of an object with the sensor 402, as described with reference to step 503 of FIG. 5. For example, when the first processor 404 determines that the biometric data detection is unavailable, the first processor 404 can maintain an operation of a second mode for determining if biometric data acquisition is available. For instance, the first processor 404 can perform a step associated with step 1101.

When the first processor 404 determines that the biometric data acquisition is available in step 1105, the first processor 404 proceeds to step 1107 and activates a third pixel set of the sensor 402. The third pixel set includes pixels capable of sensing a change of a quantity of charge. For example, the first processor 404 can activate the all of the pixels 1300 included in the sensor 402.

In step 1109, when the first processor 404 activates the pixels capable of sensing the change of the charge quantity, the first processor 404 converts the second processor 406 from a deactivated state into an activated state. For example, the first processor 404 activates the second processor 406 such that an authentication step can be carried out by the second processor 406.

Figure 14:
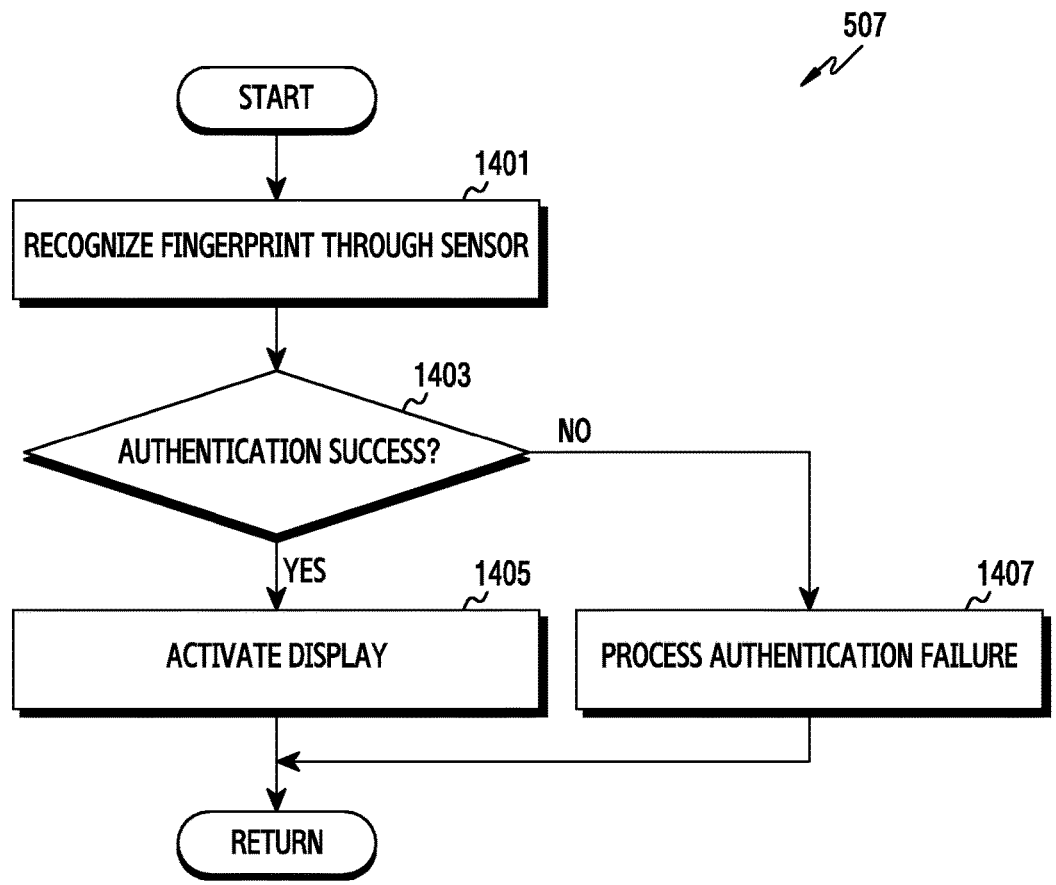
FIG. 14 is a flowchart of a procedure for authenticating a user in an electronic device, according to an embodiment of the present disclosure.
Figure 15:
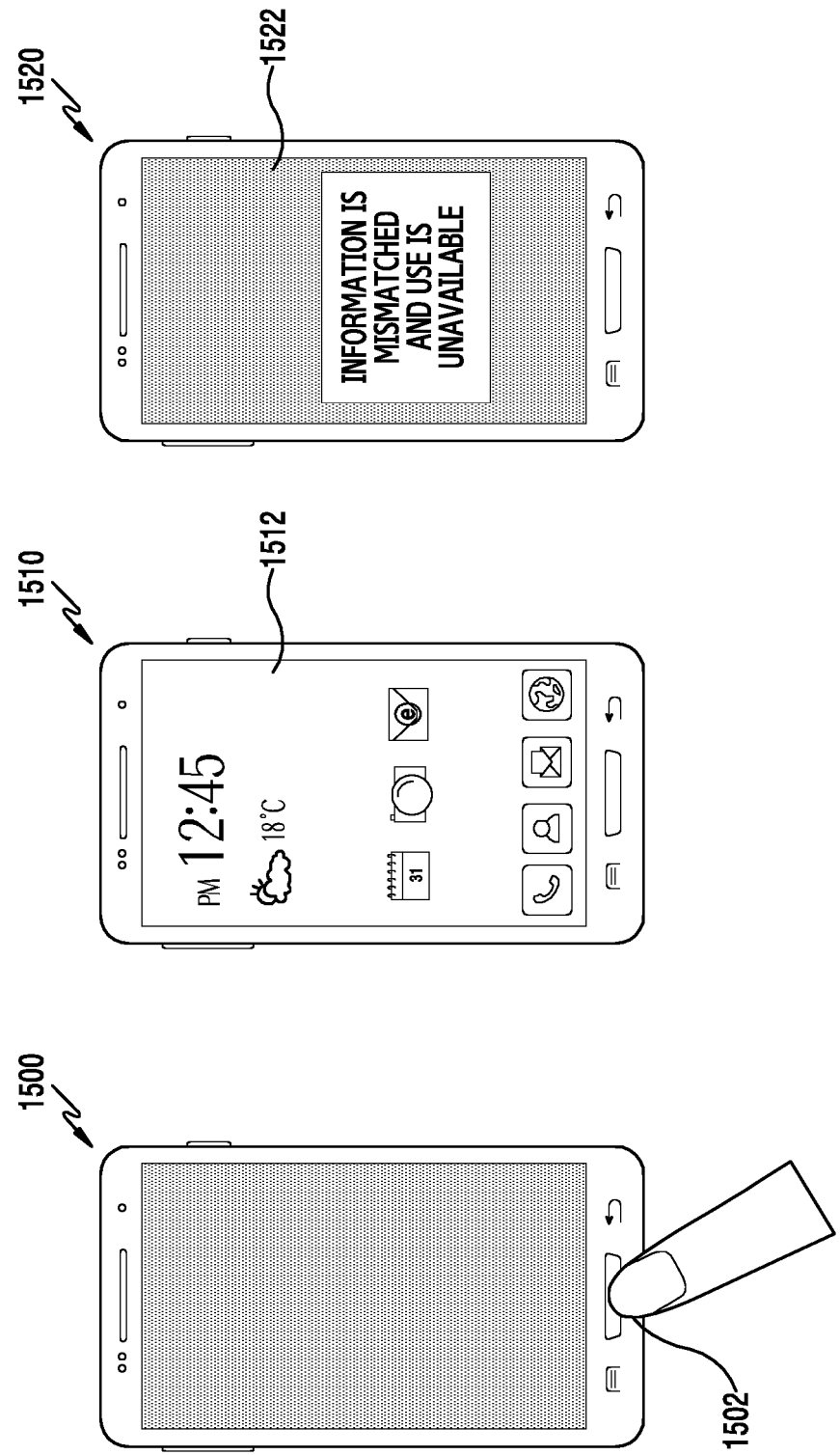
FIG. 15 illustrates an operation of an electronic device based on an authentication result, according to an embodiment of the present disclosure.

FIG. 14 is a flowchart of a procedure for authenticating a user in an electronic device, according to an embodiment of the present disclosure. FIG. 15 illustrates an operation of an electronic device based on an authentication result, according to an embodiment of the present disclosure.

Referring to FIG. 14, a procedure for authenticating a user using the second processor 406 of the electronic device 400, as described with respect to step 507 of FIG. 5, is described in further detail.

At step 1401, the second processor 406 recognizes a fingerprint through the sensor 402. For example, the second processor 406 can recognize the fingerprint, using sensing information that is acquired through the activated 3rd pixel set (e.g., all of the pixels of the sensor 402). For instance, as shown in 1500 of FIG. 15, the second processor 406 can sense an input 1502 of a user who touches a home button including the sensor 402, and generate a fingerprint image having the form of a ridge and a valley between the ridges.

At step 1403, the second processor 406 performs user authentication operation. For example, the second processor 406 can compare the fingerprint image that is generated using the sensing information acquired through the activated pixels of the sensor 402, with a stored image. For instance, the second processor 406 can extract a feature (e.g., a branch point of a ridge, an end point of the ridge, etc.) from the fingerprint image or analyze a pattern of the fingerprint image, to determine if the generated fingerprint image matches with the stored fingerprint image.

When the user authentication succeeds at step 1403, the second processor 406 proceeds to step 1405 and converts a display in a deactivated state into an activated state. For example, as shown in 1510 of FIG. 15, the second processor 406 can release a lock screen and output a home screen 1512.

When the user authentication fails in at step 1403, the second processor 406 proceeds to step 1407 and processes an authentication failure. For example, as shown in 1520 of FIG. 15, the second processor 406 can output a message 1522, to a screen, notifying of the authentication failure.

Figure 16:
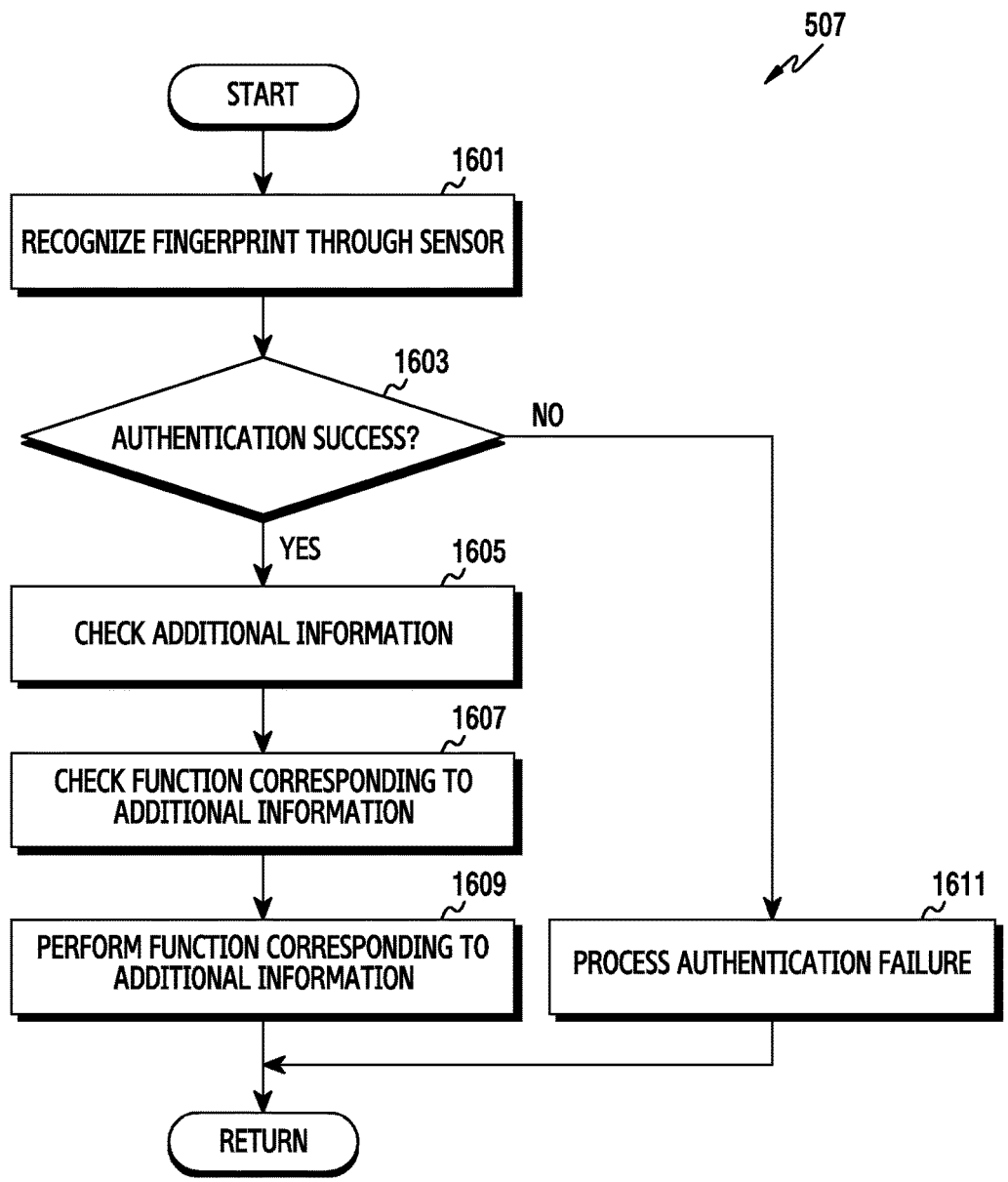
FIG. 16 is a flowchart of a procedure for authenticating a user in an electronic device, according to an embodiment of the present disclosure.
Figure 17:
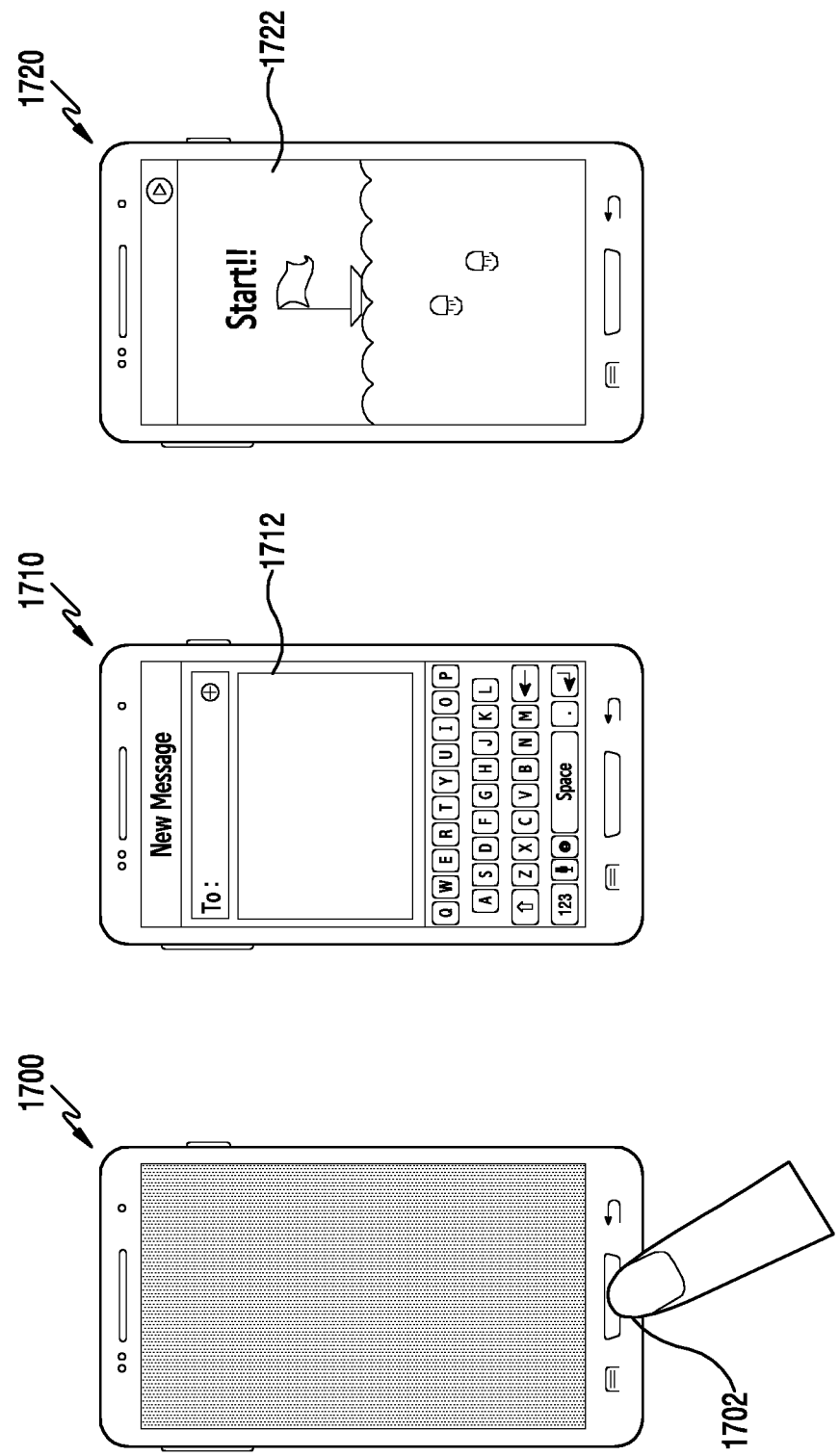
FIG. 17 illustrates an operation of an electronic device based on an authentication result, according to an embodiment of the present disclosure.

FIG. 16 is a flowchart of a procedure for authenticating a user in an electronic device, according to an embodiment of the present disclosure. FIG. 17 illustrates an operation of an electronic device based on an authentication result, according to an embodiment of the present disclosure.

Referring to FIG. 16, a procedure for authenticating a user using the second processor 406 of the electronic device 400, as described with respect to step 507 of FIG. 5, is described in further detail.

At step 1601, the second processor 406 recognizes a fingerprint through the sensor 402. For example, the second processor 406 can recognize the fingerprint, using sensing information that is acquired through the activated 3rd pixel set (e.g., all of the pixels of the sensor 402). For example, as shown in 1700 of FIG. 17, the second processor 406 can sense an input 1702 of a user who touches a home button including the sensor 402, to recognize the fingerprint.

At step 1603, the second processor 406 performs a user authentication operation. For example, the second processor 406 can compare the fingerprint recognized through the sensor 402, with stored fingerprint data. For instance, the second processor 406 can determine if the fingerprint recognized through the sensor 402 matches with a stored fingerprint.

When the user authentication fails in operation 1603, the second processor 406 proceeds to step 1611 and processes an authentication failure. The second processor 406 can output a message to the screen notifying of the authentication failure.

When the user authentication succeeds, the second processor 406 proceeds to step 1605 and checks additional information. For example, the additional information can include at least one of a pressure to an object, a pressure (or an input) maintenance time, and/or a pressure (or an input) area. For instance, the additional information can be acquired by an additional sensor that is arranged in a rear surface of a home button together with a sensor 402. For instance, the additional sensor can include a pressure sensor (or force sensor).

At step 1607, the second processor 406 checks a function corresponding to the additional information. For example, the second processor 406 can classify the additional information into at least two or more levels, and designate different execution functions to the respective levels.

At step 1609, the second processor 406 performs the function corresponding to the additional information. For example, as shown in 1710 of FIG. 17, if additional information (e.g., pressure) corresponding to a level 1 is acquired, the second processor 406 can release a lock state (or lock function) and then, execute an e-mail function 1712. As another example, as shown in 1720 of FIG. 17, if additional information (e.g., pressure) corresponding to a level 2 is acquired, the second processor 406 can release the lock function and then, execute a game function 1722. As another example, if additional information (e.g., pressure) corresponding to a level 3 is acquired, the second processor 406 can release the lock function, and then process to execute a payment function.

As described, when the authentication succeeds, additional information is acquired, however, the additional information can be acquired at other times during an operation of acquiring sensing information. For example, the second processor 406 can use the acquired sensing information as the additional information even in a state in which the first pixel set or the second pixel set is activated as well. For another example, the first processor can acquire the additional information through an additional sensor arranged in a rear surface of a home button, in a state of recognizing the fingerprint through a third pixel set of the sensor 402.

A method for operating in an electronic device according to various embodiments can include the operations of while the display is in a deactivated state, processing an input received through the finger scan sensor by using a first processor, transmitting the input to a second processor, based on that the input satisfies a designated condition, authenticating user's biometric data by using the input, and activating the display based on that authentication succeeds.

The method can include the operation of releasing a lock state of the display based on the authentication success, in case where the display is in the lock state.

The method can include the operation of changing the second processor from a deactivated state to an activation state based on that the input has a biometric data related feature.

The operation of processing the input can include the operation of sensing the input through a first pixel set that is comprised of some pixels of the finger scan sensor.

The operation of authenticating the biometric data can include the operation of sensing the input through a second pixel set that is different from a first pixel set comprised of some pixels of the finger scan sensor.

The method can include the operation of transmitting the input to the first processor, based on that a pixel of the first pixel set sensing at least a part of the input satisfies a first range. For example, the satisfying of the first range can be a situation in which an input is sensed by the finger scan sensor.

The method can include the operation of transmitting the input to the first processor, based on that a pixel of the first pixel set sensing at least a part of the input satisfies a second range. For example, the satisfying of the second range can be a situation in which an input having a biometric data related feature is sensed.

The method can include the operations of receiving additional information from a sensor different from the finger scan sensor, and after activating the display, executing a function corresponding to the additional information.

The additional information can be received through a touch sensor or a pressure sensor.

While the present disclosure has been shown and described with reference to various embodiments, it should be understood by those skilled in the art that various changes in form and details may be made without departing from the spirit and scope of the present disclosure, which is defined, not by the detailed description and embodiments, but by the appended claims and their equivalents.

What is claimed is:

1. An electronic device comprising:
a first processor;
a second processor;
a display; and
a first sensor,
wherein the first processor is configured to, receive an input through a first pixel set comprised of some pixels of the first sensor while the display is in a deactivated state, activate a second pixel set when biometric data is detected in the input, the second pixel set comprising a larger number of pixels than the first pixel set, and transmit the input to the second processor,
wherein the second processor is configured to authenticate the biometric data included in the input through the second pixel set, and activate the display if the authentication succeeds,
wherein the first sensor is configured to transmit the input to the first processor, when a number of pixels of the first pixel set sensing the at least part of the input satisfies a first range, and
wherein the first range is satisfied when the input is sensed by the first sensor.

2. The electronic device of claim 1, wherein the second processor is further configured to release a lock state, when the authentication succeeds.

3. The electronic device of claim 1, wherein the second processor is further configured to change from a deactivated state to an activated state in response to receiving the input from the first processor.

4. The electronic device of claim 1, wherein the first sensor is configured to transmit the input to the first processor, when a number of pixels of the first pixel set sensing the at least part of the input satisfies a second range, and
wherein the second range is satisfied when the biometric data is detected in the input.

5. The electronic device of claim 1, further comprising:
a second sensor, the second sensor being different from the first sensor,
wherein the second sensor is configured to receive additional information, and
wherein the second processor is further configured to, after activating the display, execute a function corresponding to the additional information.

6. The electronic device of claim 5, wherein the first sensor comprises a finger scan sensor and the second sensor comprises a touch sensor or a pressure sensor.

7. The electronic device of claim 1, wherein the first processor comprises a processor having a lower processing capability than the second processor.

8. A method of an electronic device, the method comprising:
while a display is in a deactivated state, processing, by a first processor, an input received through a first pixel set comprised of some pixels of a first sensor;
activating a second pixel set of the first sensor when biometric data is detected in the input, the second pixel set comprising a larger number of pixels than the first pixel set;
transmitting the input, by the first processor, to a second processor;
authenticating, by the second processor, the biometric data included in the input through the second pixel set;
activating, by the second processor, the display when the authentication succeeds; and
transmitting the input to the first processor, when a number of pixels of the first pixel set sensing at least a part of the input satisfies a first range,
wherein the first range is satisfied when the input is sensed by the first sensor.

9. The method of claim 8, further comprising releasing a lock state, by the second processor, when the authentication succeeds.

10. The method of claim 8, further comprising changing the second processor from a deactivated state to an activated state when the input is received from the first processor.

11. The method of claim 8, further comprising:
transmitting the input to the first processor, when a number of pixels of the first pixel set sensing at least a part of the input satisfies a second range, wherein the second range is satisfied when the biometric data is detected in the input.

12. The method of claim 8, further comprising:

receiving additional information from a second sensor which is different from the first sensor; and after activating the display, executing a function corresponding to the additional information.

13. The method of claim 12, wherein the input is received through a finger scan sensor comprising the first sensor and the additional information is received through a touch sensor or a pressure sensor comprising the second sensor.

14. A non-transitory computer-readable recording medium storing a program for executing the operations of:

while a display is in a deactivated state, processing, by a first processor, an input received through a first pixel set comprised of some pixels of a first sensor;

activating a second pixel set of the first sensor when biometric data is detected in the input, the second pixel set comprising a larger number of pixels than the first pixel set;

transmitting the input, by the first processor, to a second processor, when biometric data is detected in the input;

authenticating, by the second processor, the biometric data included in the input through the second pixel set;

activating, by the second processor, the display when the authentication succeeds; and transmitting the input to the first processor, when a number of pixels of the first pixel set sensing at least a part of the input satisfies a first range, wherein the first range is satisfied when the input is sensed by the first sensor.

15. The non-transitory computer-readable recording medium of claim 14, further storing a program for executing the operation of:

releasing a lock state, by the second processor, when the authentication succeeds.

* * * * *